(12) United States Patent
Sekiguchi et al.

(10) Patent No.: US 8,084,113 B2
(45) Date of Patent: Dec. 27, 2011

(54) MULTI-LAYERED PHASE-CHANGE OPTICAL RECORDING MEDIUM

(75) Inventors: Hiroyoshi Sekiguchi, Yokohama (JP);
Michiaki Shinotsuka, Hiratsuka (JP);
Masaru Shinkai, Yokohama (JP);
Masaki Kato, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 320 days.

(21) Appl. No.: 12/440,700

(22) PCT Filed: Aug. 30, 2007

(86) PCT No.: PCT/JP2007/067365
§ 371 (c)(1),
(2), (4) Date: Mar. 10, 2009

(87) PCT Pub. No.: WO2008/032629
PCT Pub. Date: Mar. 20, 2008

(65) Prior Publication Data
US 2009/0286036 A1    Nov. 19, 2009

(30) Foreign Application Priority Data

Sep. 11, 2006  (JP) .............................. 2006-245709
Nov. 28, 2006  (JP) .............................. 2006-320142

(51) Int. Cl.
*B32B 3/02* (2006.01)

(52) U.S. Cl. ............. 428/64.1; 428/64.4; 428/64.5; 430/270.13

(58) Field of Classification Search ............ None
See application file for complete search history.

(56) References Cited

U.S. PATENT DOCUMENTS

| | | | |
|---|---|---|---|
| 4,847,132 A | 7/1989 | Takao et al. | |
| 2004/0130998 A1* | 7/2004 | Iwasa et al. | 369/94 |
| 2004/0202079 A1 | 10/2004 | Oki | |
| 2006/0098561 A1* | 5/2006 | Iwasa et al. | 369/275.1 |
| 2006/0110569 A1 | 5/2006 | Yashiro et al. | |
| 2006/0228531 A1 | 10/2006 | Iwasa et al. | |

FOREIGN PATENT DOCUMENTS

| | | |
|---|---|---|
| EP | 0265204 | 4/1988 |
| JP | 2003-303443 | 10/2003 |
| JP | 2004-5920 | 1/2004 |

(Continued)

OTHER PUBLICATIONS

Apr. 6, 2010 Japanese official in connection with correspondent Japanese patent application.

(Continued)

*Primary Examiner* — Elizabeth Mulvaney
(74) *Attorney, Agent, or Firm* — Cooper & Dunham LLP

(57) ABSTRACT

A multi-layered phase-change optical recording medium having a first substrate and a second substrate, and a plurality of information layers, wherein each of thermal diffusion layers of information layers other than an information layer disposed at the innermost side as viewed from the first substrate side has In oxide, Zn oxide, Sn oxide and Si oxide, and when the contents of thereof are represented by "a", "b", "c" and "d" [mol %] respectively, the following requirements are satisfied, and when the refractive index of the first and second substrates was represented by "n", the laser light wavelength is represented by "λ" and the depth of the groove guide of the first and second substrates is represented by H, the H satisfied the following requirement, $3 \leq a \leq 50$ $0 \leq d \leq 30$ $a+b+c+d=100$ $\lambda/17n \leq H \leq \lambda/11.5n$.

8 Claims, 11 Drawing Sheets

FOREIGN PATENT DOCUMENTS

| | | |
|---|---|---|
| JP | 2004-47034 | 2/2004 |
| JP | 2004-47038 | 2/2004 |
| JP | 2004-95092 | 3/2004 |
| JP | 2004-327016 | 11/2004 |
| JP | 2005-4943 | 1/2005 |
| JP | 2005-4944 | 1/2005 |
| JP | 2005-25836 | 1/2005 |
| JP | 2005-122872 | 5/2005 |
| JP | 2007-118557 * | 5/2007 |
| TW | 200518084 | 6/2005 |
| WO | WO02/29787 A1 | 4/2002 |
| WO | WO2005/078153 | 8/2005 |

OTHER PUBLICATIONS

Apr. 9, 2010 European search report in connection with correspondent European patent application.

Mar. 22, 2011 Taiwanese official action (with English translation) in connection with a counterpart Taiwanese patent application.

* cited by examiner

MULTI-LAYERED PHASE-CHANGE OPTICAL RECORDING MEDIUM

TECHNICAL FIELD

This disclosure relates to a multi-layered phase-change optical recording medium having a plurality of phase-change recording layers, which enables to record, reproduce and rewrite information by irradiating phase-change recording layers with a light beam to thereby induce an optical change in a recording layer material in the phase-change recording layers

BACKGROUND ART

Typically, a phase-change optical recording medium (phase-change optical disc) such as DVD+RW has a basic structure in which a recording layer composed of a phase-change material is formed on a plastic substrate, and a reflective layer that allows for improving optical absorptance of the recording layer and has a thermal diffusion effect is formed on the recording layer, and such a typical phase-change optical recording medium is irradiated with a laser beam from the substrate surface side, thereby information can be record and reproduced. A phase-change recording material is phase-changed between an amorphous phase and a crystalline phase by application of heat of laser beam irradiation and subsequent cooling. When, after a rapid heating treatment of a phase-change recording material, the phase-change recording material is immediately quenched, the phase-change recording material is changed into an amorphous phase, and when the phase-change recording material is slowly cooled after the rapid heating treatment, it is crystallized. These characteristics are applied for recording and reproducing information in phase-change optical recording media.

Further, for the purpose of preventing oxidation, transpiration or deformation of a recording layer which are caused by application of heat for light beam irradiation, a phase-change optical recording medium is typically provided with an under protective layer (also called as an under dielectric layer) in between a substrate and a recording layer, and an upper protective layer (also called as an upper dielectric layer) in between the recording layer and a reflective layer. These protective layers can respectively function to control optical properties of the optical recording medium by adjusting the thickness thereof, and the under protective layer also has a function to prevent the substrate from softening due to heat applied to the recording layer during recording.

In recent years, with increased information volume handled with computers, recording capacities of rewritable optical discs such as DVD-RAM, DVD-RW and DVD+RW are largely increased, and high-density recording of information is advanced. DVD has a recording capacity of around 4.7 GB, however, in the days to come, requests for high-density recording are further expected to increase. Along with increased information volume, it should be considered that enhancement of recording speed is also required. Presently, as a rewritable DVD disc, an optical recording medium with a single-recording layer that allows for 8× recording speed is commercially available. As a method for allowing for high-density recording using such a phase-change optical recording medium, for example, there have been proposals to shift a wavelength of a laser beam to be used toward shorter wavelengths to blue region or to enlarge the numerical aperture (NA) of an objective lens used for optical pick-up to record or reproduce information to thereby change the spot size of the laser beam applied to an optical recording medium to smaller, and these methods have been studied, developed and put into practical use.

For a technique to increase recording capacity by improving an optical recording medium itself, various types of two-layered phase-change optical recording media are proposed that are produced such that two information layers each composed of at least a recording layer and a reflective layer are laid one on top of another on one surface of a substrate, and the two information layers are bonded together with an ultra-violet curable resin or the like. A separation layer (called an intermediate layer in the present invention) which is the bonded part between these information layers has a function to optically separate the two information layers and is composed of a material that less absorbs laser beam or avoid absorbing laser beam unnecessarily because the laser beam used for recording and reproducing needs to reach the innermost information layer as viewed from the laser irradiation side.

There are still many problems existing in such a two-layered phase-change optical recording medium.

For example, when an information layer (a first information layer) disposed at the front side as viewed from the laser beam irradiation side is not sufficiently transmissive to a laser beam, it is impossible to record and reproduce information on a recording layer of another information layer (a second information layer) disposed at the innermost side as viewed from the laser beam irradiation side, and thus a reflective layer constituting the first information layer must be a ultrathin semi-transparent reflective layer. As the result, it is difficult to obtain light transmittance and heat dissipation effect, and it is necessary to form a heat diffusion layer (a light transmissive layer) so as to make contact with the semi-transparent reflective layer to increase the light transmittance and supplement the heat dissipation effect. Further, as compared to conventional single-layer phase-change optical recording media or conventional two-layered recordable optical recording media, the reflectance of a two-layered phase-change optical recording medium is extremely low of about one third of that of each of these conventional media. Thus, it is considered that it may be difficult to record and reproduce information on the first information layer as well as on the second information layer even with stable tracking ability provided. Further, since the first information layer has a layer structure in which heat is hardly dissipated, from the perspective of storage stability, it is not conceivable that any materials may be used for the recording layer just because a phase-change material is used. Actually, it is necessary to limit materials and the composition of the recording layer for the first information layer.

As a known technique, Patent Literature 1 discloses a two-layered phase-change optical recording medium provided with a substrate having a groove depth of 10 nm to 30 nm and using a laser beam having a wavelength of 360 nm to 420 nm, however, an upper protective layer in a first recording layer structure of the two-layered phase-change optical recording medium is composed of $ZnS$—$SiO_2$, and the layer composition differs from that of the multi-layered phase-change optical recording medium of the present invention.

Patent Literature 2 discloses an optical recording medium provided with a thermal diffusion layer containing an In oxide and an Sn oxide as the main components, in which the content of the In oxide is 90 mol % or more. Patent Literature 3 discloses an optical recording medium provided with a thermal diffusion layer containing an Sn oxide and an Sb oxide, and Patent Literature 4 discloses an optical recording medium provided with a thermal diffusion layer containing an In oxide and a Zn oxide as the main components, in which the content of the In oxide is 50% or more. However, these disclosed optical recording layer respectively have a different layer composition from that of the optical recording medium of the present invention, and there is no description on groove depth of the substrate, unlike the present invention.

Patent Literature 5 discloses a two-layered recordable optical recording medium with recording layers composed of an organic dye or organic dyes, in which the range of the groove depth is 4λ/16n to 7λ/16n, however, the two-layered recordable optical recording medium can ensure a reflectance of about 20%, and the optical recording medium configuration basically differs from that of a two-layered phase-change optical recording medium, and the groove depth range also differs from that of a two-layered phase-change optical recording medium.

Further, Patent Literature 6 describes a two-layered optical recording medium in its claim 8, however, the optical recording medium configuration is basically different from that of the two-layered phase-change optical recording medium of the present invention.

Patent Literature 1 Japanese Patent Application Laid-Open (JP-A) No. 2004-005920
Patent Literature 2 Japanese Patent Application Laid-Open (JP-A) No. 2004-047034
Patent Literature 3 Japanese Patent Application Laid-Open (JP-A) No. 2004-047038
Patent Literature 4 Japanese Patent Application Laid-Open (JP-A) No. 2005-004943
Patent Literature 5 Japanese Patent Application Laid-Open (JP-A) No. 2005-004944
Patent Literature 6 International Publication No. WO02/029787

BRIEF SUMMARY

In an aspect of this disclosure, there is provided a multi-layered phase-change optical recording medium that has a plurality of information layer, each of the information layers other than an information layer disposed at the innermost side as viewed from the laser beam irradiation side has a high light transmittance to allow stable recording and reproducing of information in the respective information layers, and is excellent in repetitive use durability and in storage stability.

The above-noted object can be achieved by the means according to Various other aspects can be provided, including, for example, the following items <1>to <5>.

<1> A multi-layered phase-change optical recording medium, including a first substrate disposed at the front side as viewed from the laser beam irradiation side, a second substrate disposed at the innermost side as viewed from the laser beam irradiation side, each of the first substrate and the second substrate having a serpentine spiral guide groove on a recording surface side thereof, intermediate layers, and a plurality of information layers each having a phase-change recording layer, being disposed via each of the intermediate layers in between the first substrate and the second substrate, each of the information layers other than the information layer disposed at the innermost side as viewed from the first substrate side includes the following five layers: an under protective layer, the phase-change recording layer, an upper protective layer, a semi-transparent reflective layer, and a thermal diffusion layer or a light transmissive layer, and the information layer disposed at the innermost side as viewed from the first substrate side includes an under protective layer, the phase-change recording layer, an upper protective layer and a reflective layer, wherein each of the thermal diffusion layers or light transmissive layers of the respective information layers other than the information layer disposed at the innermost side as viewed from the first substrate side contains an In oxide, a Zn oxide, an Sn oxide and an Si oxide, and when the contents of the In oxide, the Zn oxide, the Sn oxide and the Si oxide are represented by "a", "b", "c" and "d" [mol %] respectively, the following requirements are satisfied, and when the refractive index of the first and second substrates was represented by "n", the laser light wavelength is represented by "λ" and the depth of the groove guide of the first and second substrates is represented by H, the depth of the groove guide H satisfies the following requirement, $3 \leq a \leq 50$ $0 \leq d \leq 30$ $a+b+c+d=100$ $\lambda/17n \leq H \leq \lambda/11.5n$.

<2> The multi-layered phase-change optical recording medium according to the item <1>, wherein each of the phase-change recording layers contains at least three elements of Ge, Sb and Te, and when the composition ratio of the Ge, Sb and Te is represented by "α", "β" and "γ" [atomic %], the following requirements are satisfied, $2 \leq \alpha \leq 20$ $60 \leq \beta \leq 75$ $6 \leq \gamma \leq 30$.

<3> The multi-layered phase-change optical recording medium according to any one of the items <1> to <2>, wherein each of the upper protective layer in the respective information layers other than the information layer disposed at the innermost side as viewed from the first substrate side contains an In oxide, a Zn oxide, an Sn oxide and an Si oxide or a Ta oxide, and when the contents of the In oxide, the Zn oxide, the Sn oxide and Si oxide or the Ta oxide are represented by "e", "f", "g" and "h" [mol %] respectively, the following requirements are satisfied, $3 \leq e \leq 20$ $50 \leq f$ or $g \leq 90$ $0 \leq h \leq 20$ $e+f+g+h=100$.

<4> The multi-layered phase-change optical recording medium according to any one of the items <1> to <3>, wherein each of the semi-transparent reflective layers in the respective information layers other than the information layer disposed at the innermost side as viewed from the first substrate side contains Cu as the main component.

<5> The multi-layered phase-change optical recording medium according to any one of the items <1> to <4>, wherein each of the under protective layers in the respective information layers contains ZnS and $SiO_2$.

BEST MODE FOR CARRYING OUT THE INVENTION

Hereinafter, the present invention will be described in detail.

The present invention is a multi-layered phase-change optical recording medium having a plurality of information layers between a first substrate and a second substrate as described above, in which thermal diffusion layers (light transmissive layers) of respective information layers other than an information layer disposed at the innermost side as viewed from the laser beam irradiation side are composed on materials of an In oxide, a Zn oxide, an Sn oxide and an Si oxide and the content of these materials is set within a range specified in a first embodiment of the present invention, thereby the light transmittance of the respective information layers can be increased and the recording sensitivity of the respective information layers can be enhanced. As the result, the light reflectance at the information layer disposed at the innermost side as viewed from the laser beam irradiation side can be increased, and thus information can be reduced and reproduced with stable tracking ability. Here, a refractive index of the first and second substrates is represented as "n", the wavelength of a laser beam is represented as "λ" and the depth of the groove depth of the first and second substrates is represented as "H". On a multi-layered phase-change optical recording medium having a low light reflectance, information can be recorded and reproduced with stable tracking ability by setting the groove depth of the guide groove H within a range specified in the first embodiment of the present invention to induce a phase change to reflected light beams from concave and convex portions of the guide groove (generally, concave portions are called "land portion" and convex portions are called "groove portion") and detecting the difference in quantity of reflected light beams. Respective refractive indexes "n" and respective groove depths "H" of the first and second substrates may be the same to each other or may be different to each other, however, typically they are respectively set to have the same value between the first substrate and the second substrate. It should be noted that a laser beam that can be used in the present invention has a wavelength λ within a red wavelength region of 645 nm to 665 nm. Details on material of the substrates will be described below, and typically, a polycarbonate having a refractive index "n" of 1.55 to 1.60 is used.

Figure 1:
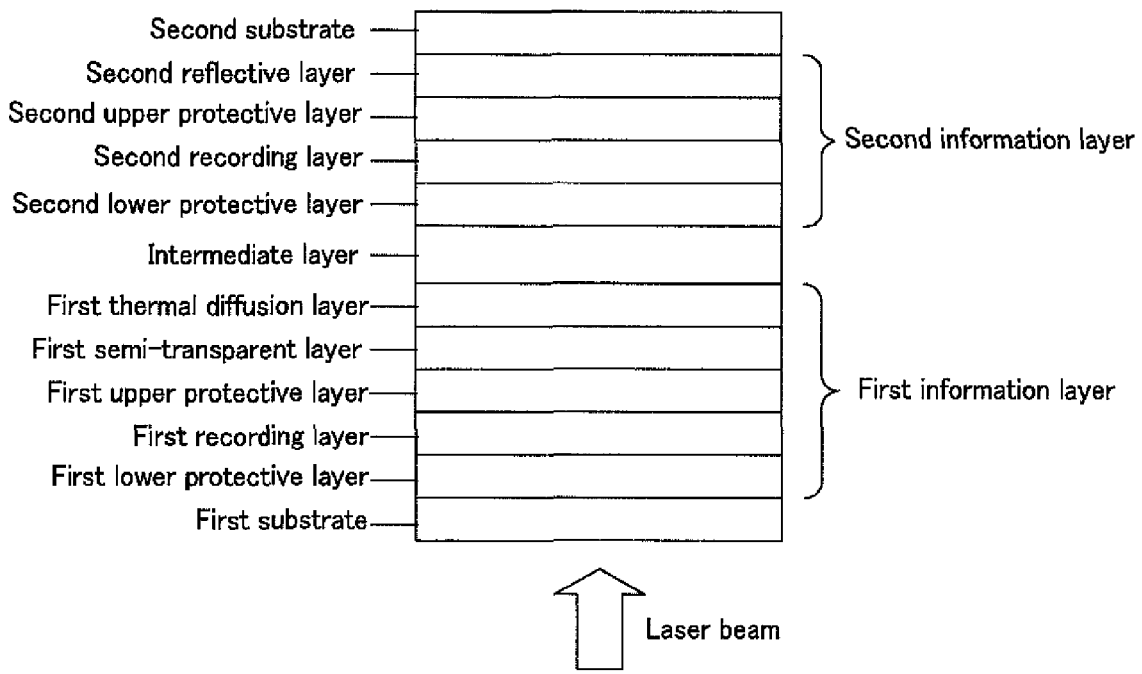
FIG. 1 is a view showing one example of a layer configuration of a two-layered phase-change optical recording medium.

FIG. 1 shows one example of a layer configuration of an optical recording medium having two layers of information layer each of which includes a phase-change recording layer.

During rotation of an optical disc, an eccentric error of several ten micrometers occurs due to eccentricity and axis-variation etc. between the central hole and the track core of the optical disc. Particularly, as can be seen in a multi-layered optical recording medium, the eccentricity amount of an information layer that is distantly located from an optical pickup is usually greater than that of an information layer located at the front side as viewed from the optical pickup. For this reason, to constantly and accurately scan the information tracks with a laser beam spot, it is necessary to detect a tracking error with an optical pickup, drive a tracking actuator connected to a servo circuit and control a fine position of the object lens. Thus, designing of a groove depth formed on a substrate is particularly important to an optical recording medium having a low reflectance like a multi-layered phase-change optical recording medium.

As typical examples of tracking error signals, push-pull signals are exemplified. A reflected light beam is picked up with an objective lens from a disc having a guide groove with a track pitch "p", and a push-pull signal can be detected with a photodiode split behind the objective lens. A periodically arrayed guide groove is a sort of diffraction grating, and in reflected lights, a zero-order light that goes straight on and a ± first-order light that is diffracted at an angle θ are generated. Here, θ (theta) is represented by $\sin^{-1}(\lambda/p)$. Among reflected lights to the objective lens, besides the zero-order light, part of the ± first-order light is picked up with the objected lens. At a region where diffracted lights of the zero-order light and the first-order light are overlapped, interference of light is generated. The intensity of the lights varies due to track misalignment of a laser beam applied to the optical recording medium.

Figure 2:
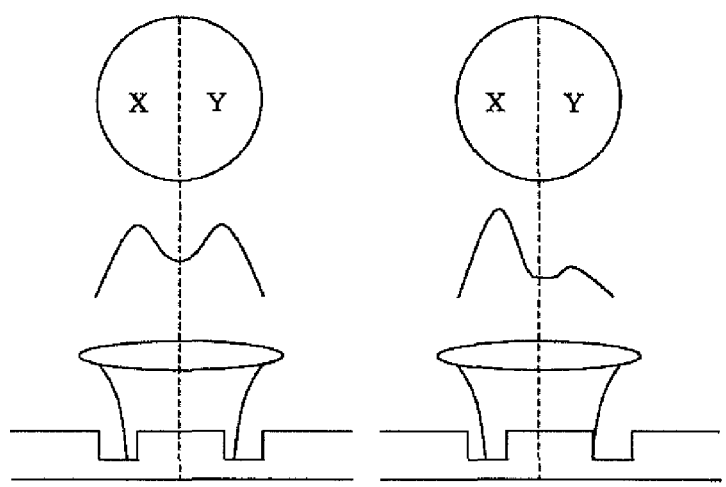
FIG. 2 is a view showing intensity distributions of reflected lights.

A two-split photodiode (which may be a quadruple-detector photodiode though) separately detects a region where the zero-order light and the ±first-order light are overlapped to read a difference signal to thereby generate a tracking error signal. FIG. 2 shows intensity distributions of reflected lights. When the center of a laser beam is in accord with the center of a guide groove, the intensity distribution of reflected light is a symmetrical distribution and the respective output from the photodiode results in the equation, X=Y. When a tracking misalignment occurs, the intensity distribution of reflected light is an asymmetrical distribution and a value X is greater than a value Y. When a tracking error signal Z is defined as being equal to X−Y. i.e., Z=X−Y, the value Z is represented by the following equation.

$$Z=4(S1)(E1)\sin(\phi 1))\sin(2\pi\Delta p/p)$$

In the equation, S1 represents an area in which the zero-order light and the first-order light are overlapped on a detector; E0 and E1 respectively represent an amplitude of the zero-order light and an amplitude of the first-order light; $\phi 1$ represents a phase difference between the zero-order light and the first-order light; "p" represents a track pitch; and $\Delta p$ represents a track misalignment amount. Since the tracking error signal Z has a value that depends on the tracking misalignment amount $\Delta p$ and is an odd function, the value Z shows that the beam spot is misaligned in either the plus direction or minus direction.

Figure 3:
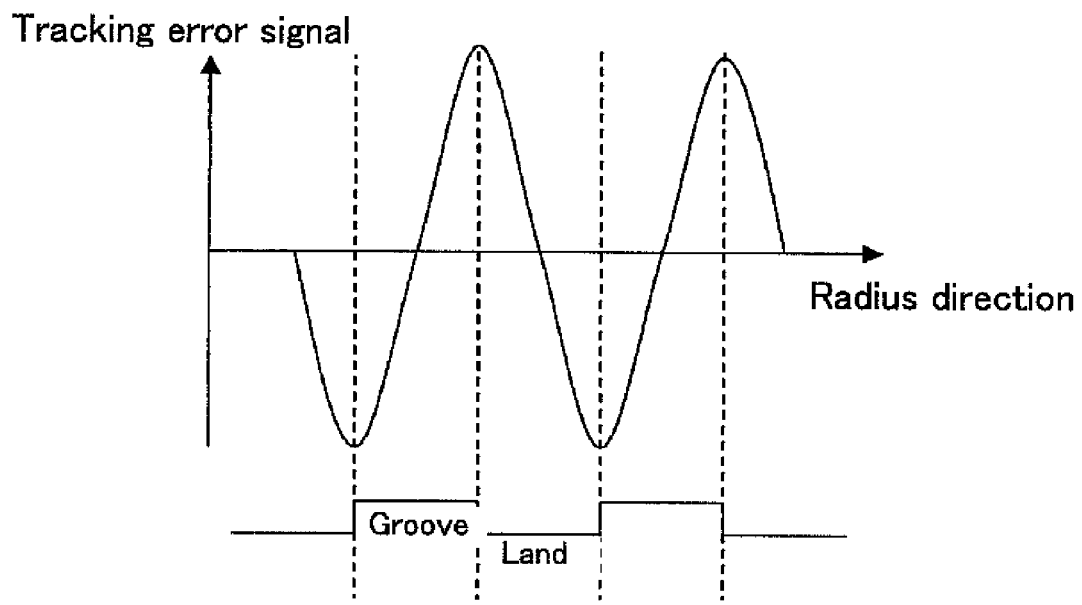
FIG. 3 is a graph showing a relation between a groove and tracking error.
Figure 4:
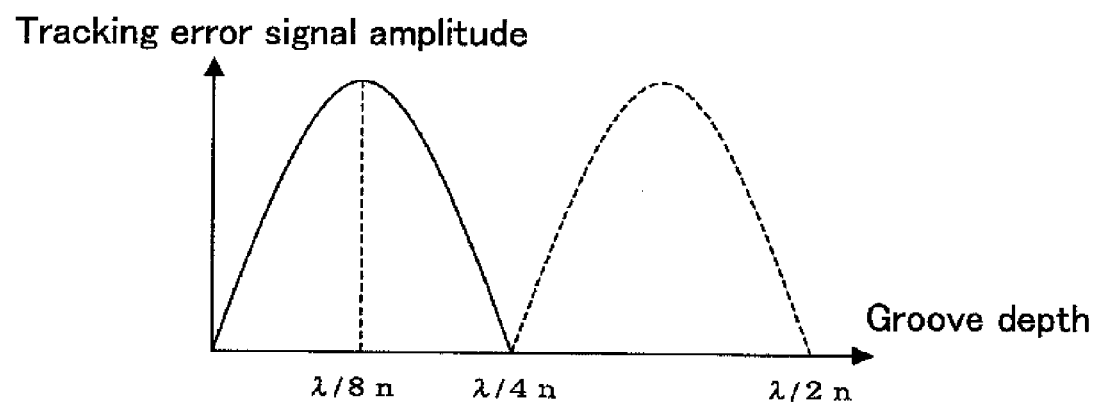
FIG. 4 is a graph showing a relation between groove depth and tracking error signal amplitude.

FIG. 3 shows a relation between a groove in an optical recording medium and tracking error. When the laser beam center is in accord with the groove center or the center of a land portion, the tracking error signal is zero. When the laser beam center is not in accord with the land center and the misaligned position between the laser beam center and the land center is at the inner position of the land portion or at the outer position of the land portion as viewed from the radius direction of the optical disc, the plus/minus sign of reflected light is reversed and the tracking misalignment amount and the plus or minus direction in the radius direction can be distinguished. And the tracking misalignment amount is used for a servo signal. When $\sin(\phi 1)$ is a maximum value, the maximum amplitude of the tracking error signal Z can be obtained. When the groove shape is rectangular and the groove depth is $\lambda/(8n)$ ("n" is a refractive index of a substrate), the value $\phi 1$ is equal to $\pi/2(\phi 1=\pi/2)$ and the maximum amplitude can be obtained. For this reason, the depth of a guide groove of an optical disc is often set at near $\lambda/(8n)$ (see FIG. 4). However, optical properties and thermal transfer characteristic depending on the layer configuration of an optical recording medium affect recording properties of the optical recording medium, and the recording properties are also changed depending on the groove depth employed. Therefore, it is necessary in the present invention that each groove depth H of the first substrate and the second substrate be set to $\lambda/(17\times n)\leq H\leq\lambda/(11.5\times n)$. Patent Literature 6 proposed to set each groove depth H of a first substrate and a second substrate to 0 to $\lambda/(4n)$, however, when the each groove depth is set within the range, it is difficult to satisfy both excellent recording properties and highly stable tracking accuracy with the use of a groove depth within the range. A higher push-pull signal amplitude means more excellent property. However, in view of a balance with recording properties, an excessively high push-pull signal amplitude is not always preferable. Thus, there is a need to design a groove depth taking into account both of the properties. The results of push-pull signal in the present invention was measured using a photodetector shown in FIG. 5 based on the expression, $[(1a+1b)-(1c+1d))/[1a+1b+1c+1d]$.

The first substrate needs to be transmissive to a light beam irradiated for recording and reproducing, and material conventionally known in the art can be used. Typically, glass, ceramics or resins are used for the first substrate, and resins are particularly preferable in terms of formability and cost. Examples of the resin include polycarbonate resins, acryl resins, epoxy resins, polystyrene resins, acrylonitrile-styrene copolymer resins, polyethylene resins, polypropylene resins, silicon resins, fluorine resins, ABS resins and urethane resins. Acryl resins such as polycarbonate resins and polymethyl methacrylate (PMMA) are preferable because they are excellent in formability, optical properties and cost.

A surface of the first substrate with information layers formed thereon has a helical or concentric wobbled groove, and a convexo-concave pattern called land portion and groove portion is formed thereon. Typically, a groove is transcribed on a substrate surface using a stamper attached in a die by injection molding method or a photopolymer method, thereby the substrate surface is formed. The thickness of the first substrate is preferably about 10 μm to 590 μm.

For material of the second substrate, the same material as the one used for the first substrate may be used, or a material that is opaque to recording and reproducing light beam may be used, or the material and groove shape of the second substrate may differ from those for the first substrate. The thickness of the second substrate is not particularly limited, however, it is preferable to adjust the thickness so that the total thickness of the first and second substrates is 1.2 mm.

For a thermal diffusion layer (light transmissive layer), there are known techniques using ITO[$In_2O_3$ (main components) —$SnO_2$] prepared by mixing an In oxide and an Sn oxide or using IZO[$In_2O_3$ (main components) —ZnO] as a thermal diffusion layer material of conventional optical discs, however, an In oxide-rich material is highly expensive, and the use of an In oxide-rich material is problematic in terms of production cost. In addition, in the course of development of an optical recording medium with the use of an In oxide-rich material, it was found that the first information layer cannot have a sufficient light transmittance and the recording sensitivity of the first information layer is degraded because of its high thermal conductivity. Therefore, to increase the light transmittance of the first information layer and increase the light reflectance of the second information layer to thereby enhance tracking accuracy while ensuring a proper thermal conductivity value, there is a need to find out a material having a high sputtering rate and allowing for ensuring recording properties and recording sensitivity, separately from ITO and IZO which have been conventionally used for thermal diffusion layers.

Then, the present inventors studied a mixture of oxides having a higher light transmittance on a thermal diffusion layer (light transmissive layer) and enabling to more efficiently enhance recording sensitivity than IZO and ITO. Consequently, the study result showed that there is a need to mix an In oxide, a Zn oxide, an Sn oxide and an Si oxide at the following composition ratio when the respective contents of the In oxide, An oxide, Sn oxide and Si oxide are represented by a, b, c and d [mol %].

$$3\leq a\leq 50$$

$$0\leq d\leq 30$$

$$a+b+c+d=100$$

Use of an In oxide of less than 3 mol % is unfavorable because a sufficient thermal conductivity cannot be obtained and the obtained thermal diffusion layer is hardly sputtered because of decreased electrical conductivity. When the content of In oxide is more than 50 mol %, a high light transmittance cannot be ensured and the cost is very expensive. Furthermore, the recording sensitivity of the first information layer is degraded due to the high thermal conductivity. Use of an Si oxide within the above-noted range is preferable because it can improve repetitive recording durability of the first information layer. The preferred content ratio for a Zn oxide and an Sn oxide is not particularly limited, however, when either material is highly contained, the sputtering rate tends to be high. These oxides respectively have a high electrical conductivity and allows for DC (direct current) sputtering, and thus when a thermal diffusion layer (light transmissive layer) having a layer thickness of around 60 nm is formed, the layer can be formed in a short time. Further, by reducing the content of an In oxide, it is possible to increase the light transmittance of the first information layer and further to enhance recording sensitivity thereof (see FIG. 20). All of the four types of oxides are materials that do not accelerate deterioration of reflective layers.

Figure 6:
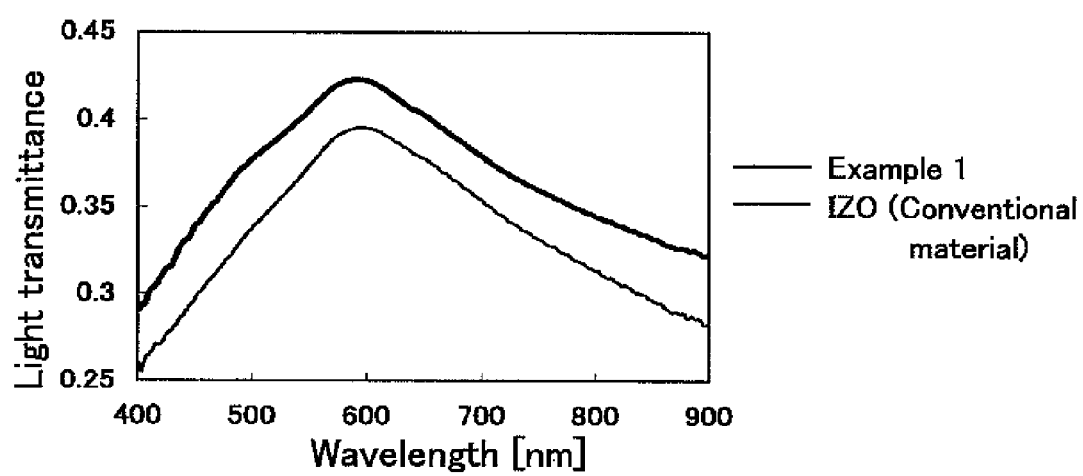
FIG. 6 is a comparative graph comparing a light transmittance of a conventional thermal diffusion layer material and a light transmittance of the thermal diffusion layer (light transmissive layer) material of the present invention.

FIG. 6 shows measurement results of light transmittance of a first information layer of an optical recording medium which was prepared in the same manner as an optical recording medium produced in Example 1, which will be described hereinafter, except that material of the thermal diffusion layer (light transmissive layer) used in Example 1 was changed to IZO. It clearly shows that the optical recording medium of Example 1 has a higher light transmittance than the optical recording medium using IZO for the thermal diffusion layer.

The layer thickness of the thermal diffusion layer (light transmissive layer) is preferably within a range of 40 nm to 80 nm. When the thermal diffusion layer thickness is thinner than 40 nm, heat dissipation ability is degraded and repetitive use durability of the optical recording medium degrades. When thicker than 80 nm, it is unfavorable because the light transmittance is decreased.

The thermal diffusion layer (light transmissive layer) mentioned above can be formed by various vapor growth methods such as vacuum evaporation method, sputtering method, plasma CVD method, photo-CVD method, ion plating method and electron beam deposition method. Of these, sputtering method is excellent in mass-productivity, film quality and the like.

The intermediate layer preferably has small light absorption coefficient to light of wavelengths irradiated for recording and reproducing information. For materials of the intermediate layer, resins are preferably used in terms of formability and cost, and ultraviolet (UV) curable resins, delayed resins, thermoplastic resins etc. can be used.

The intermediate layer is the one that enables an optical pickup to identify the first information layer and the second information layer to optically separate them, and the thickness of the intermediate layer is preferably 10 μm to 70 μm. When the thickness of the intermediate layer is thinner than 10 μm, cross-talk phenomenon occurs between information layers. When thicker than 70 μm, spherical aberration occurs when information is recorded or reproduced on the second information layer, and it tends to be difficult to record and reproduce information.

Development on conventional materials for recording layers is broadly divided into two streams. One stream includes GeTe which is a material used for recordable recording layers; $Sb_2Te_3$, i.e., an alloy between Sb and Te, which is reversibly phase-changeable; and a recording layer material consisting of a ternary alloy of GeSbTe prepared from a solid solution or an eutectic composition of the above-noted two materials. Another stream include recording layer materials composed of an alloy between Sb and Te similarly to the above, however, the alloy is an eutectic composition of Sb and $Sb_2Te_3$ in which a trace amount of elements is added to SbTe having a Sb content of around 70%.

In an optical recording medium having multiple recording layers, particularly an information layer disposed at the front side as viewed from the laser beam irradiation side is required to have a high light transmittance in consideration of recording and reproducing an information layer disposed at the innermost side as viewed from the laser irradiation side. To meet the need, it is necessary to make recording layers thin in parallel with efforts to reducing light absorbance of metal layers. A thinner layer thickness of a recording layer reduces a crystallization rate thereof, therefore, it is advantageous to select a recording layer material itself having a high crystallization rate. Then, among the two streams of the materials for recording layers, the latter material, i.e., a SbTe eutectic composition containing Sb at around 70% is preferable to the former material.

However, according to studies by present inventors, it was found that when the content of Sb is increased to achieve a higher crystallization rate, i.e., to achieve a higher linear velocity, the crystallization temperature was decreased and the storage stability of the optical recording medium was degraded.

In a multi-layered phase-change optical recording medium, when an information layer disposed at the innermost side as viewed from the laser beam irradiation side is reproduced, there is a problem that the amplitude of reproducing signals is low because of its low reflectance which is attributable to light absorption or the like of an information layer disposed at the front side as viewed from the laser beam irradiation side. Taking the problem into account, a higher reproducing light power is required than in reproducing an optical recording medium having a single recording layer.

In use of the SbTe material, to achieve a high crystallization rate, it requires only to increase the Sb content, however, it causes a decreasing trend of the crystallization rate. Therefore, when information is reproduced on an information layer using SbTe disposed at the front side as viewed from the laser beam irradiation side with a high reproducing light power, it may cause a problem that amorphous marks are re-crystallized and cannot be reproduced. It is also unfavorable because a decreased crystallization temperature triggers an unstable storage condition. Then, a crystallization rate can be kept high at information layers by adding a third element Ge to SbTe material, thereby it is possible to maintain an optical recording medium stable during storage without causing re-crystallization of amorphous marks even when reproducing information with a high reproducing light power.

For a phase-change recording material allowing for obtaining excellent recording properties, reproducing information with a high reproducing light power and stabilizing the storage condition, used for phase-change recording layers of a multi-layered phase-change optical recording medium, materials containing at least three elements of GeSbTe are preferable.

Further, other elements may be added to the GeSbTe ternary material. For the additive elements, Ag and In are preferable, and they are typically used for storage stability. The composition ratio of the total additive elements is preferably set to 8 atomic % or less. When the composition ratio is more than 8 atomic %, the crystallization rate of the recording layer is slow, although the storage stability is enhanced, resulting in a difficulty in recording at high speed. Further, it is unfavorable because stability of recorded condition to a reproducing light is degraded.

As defined in the item <2>, i.e, a second embodiment of the present invention, when the Sb content (β) is within the range of 60≦β≦75 (atomic %), as a phase-change recording material, Sb material allows for recording and reproducing information in a stable manner. When the Sb content (β) is less than 60 atomic %, information cannot be record and reproduced in a stable manner, and further, as a multi-layered phase-change optical recording medium, it may result in a recording layer that is not suited for high-speed recording. With the use of a Sb content more than 75 atomic %, the crystallization temperature is decreased and it is difficult to reproduce information with a high reproducing light power, resulting in an unstable storage condition, although the crystallization rate is increased.

Te has a function to accelerate generation of an amorphous condition and to increase the crystallization temperature. However, when combining only Te singularly with Sb, these is a possibility that recorded amorphous marks are lost due to long-term storage or storage at high temperature because of the insufficient temperature increasing rate of the crystallization temperature and poor stability of the amorphous phase, although it is possible to adjust the crystallization rate utilizing the amorphousis-accelerating effect. In contrast, use of a combination of Te with Ge have advantages in that stability of amorphous phase can be ensured by using Ge and stability of a crystalline phase can also be enhanced. Generally, a crystallized condition is a highly stable condition, however, in the case of a material used for high-speed recording taken up here, the crystallization progresses at high speed at the time of initialization or recording, and thus it cannot be necessarily said that a formed crystallized condition is stable. For this reason, when information is recorded again after long-term storage or storage at high temperature, it causes a problem that recording properties and recording conditions are changed from the condition before storage. The reason is considered that the crystallized condition is changed by storage from the crystallized condition before storage. However, an addition of Te to materials for recording layer can reduce such variation of recording properties and recording conditions caused by storage.

To obtain an effect of reducing variation of recording properties and recording conditions before and after storage by improving stability of crystal as described above, it is desirable to add Te at 6 atomic % or more (6≦γ). However, an excessively large amount of Te addition causes a too slow crystallization rate, causing a loss of ability to repeatedly record information at high speed. When Te is used for the first recording layer of the multi-layered phase-change optical recording medium of the present invention, it is preferable to set the Te amount to 30 atomic % or less (γ≦30).

Further, use of a Ge (α) amount within a range of 2≦α≦20 (atomic %) enables to reproduce information with high-reproducing light power and ensures an excellent storage condition. Addition of a Ge amount of less than 2 atomic %, the effect of Ge addition cannot be obtained and an excellent storage condition cannot be obtained. In contrast, addition of a Ge amount of more than 20 atomic %, the recording sensitivity is degraded because of its high-melting point of the Ge itself, although stability with a reproducing light and storage stability are highly maintained because the crystallization temperature can be set high.

The layer thickness of the first recording layer is preferably within a range of 4 nm to 10 nm. When the first recording layer has a layer thickness less than 4 nm, signal quality is degraded due to an excessively low reflectance, and the repetitive recording properties are degraded. When thicker than 10 nm, it is unfavorable because the light transmittance is decreased. The layer thickness of the second recording layer is preferably within a range of 10 nm to 20 nm. When the second recording layer has a layer thickness less than 10 nm, the repetitive recording properties are degraded, and when thicker than 20 nm, the recording sensitivity is degraded.

In a third embodiment of the present invention, when the upper protective layers of respective information layers other than the information layer disposed at the innermost side as viewed from the first substrate side contains an In oxide, a Zn oxide, an Sn oxide and an Si oxide or a Ta oxide and each of contents of the In oxide, Zn oxide, Sn oxide and Si oxide or Ta oxide is represented as e, f, g and h [mol %], the following requirements are satisfied:

$3 \leq e \leq 20$ $50 \leq f$ or $g \leq 90$ $0 \leq h \leq 20$ $e+f+g+h=100$

Figure 7:
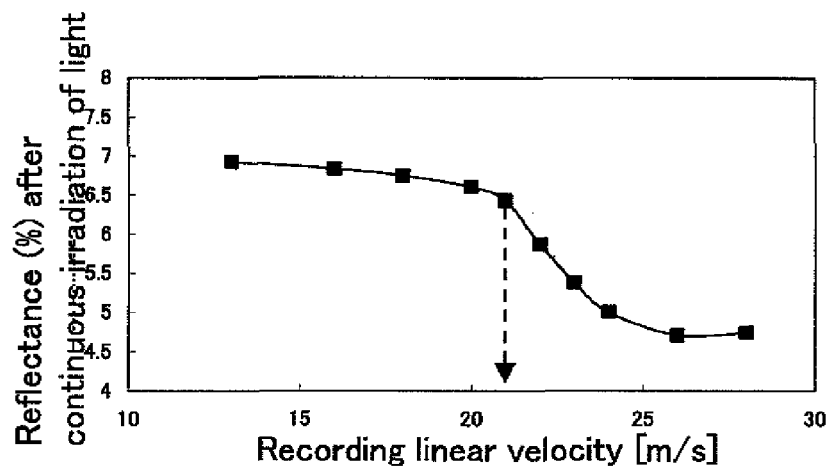
FIG. 7 is an illustration explaining a linear velocity transition.

Use of a composition satisfying all the expressions stated above is preferable because it enables to increase recording speed by containing a Zn oxide or an Sn oxide at 50 mol % or more in the upper protective layers to thereby accelerate crystallization of the recording layers. An alternative property to crystallization rate is transition linear velocity. Transition liner velocity is a linear velocity, specifically, when a reflectance of a recording layer after being irradiated with a light beam continuously is monitored at a constant linear velocity, transition linear velocity means a linear velocity at which the reflectance starts changing. In FIG. 7, the transition linear velocity is 21 m/s. Generally, a faster transition linear velocity increases the recording speed. In FIG. the continuous light power is set at 15 mW.

Figure 8:
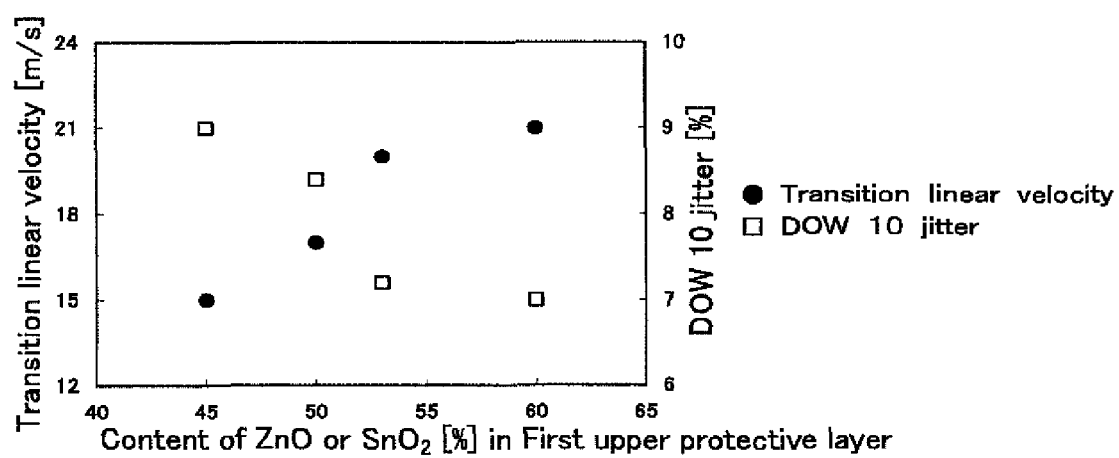
FIG. 8 is a graph showing a relation between a content of ZnO or $SnO_2$ contained in the first upper protective layer of the present invention, a linear velocity transition and a jitter value.

As shown in FIG. 8, by containing a Zn oxide or an Sn oxide at 50 mol % or more in an upper protective layer, a DOW10 jitter value of lower than 9% can be realized, and excellent jitter property can be obtained at high-speed recording.

Figure 9:
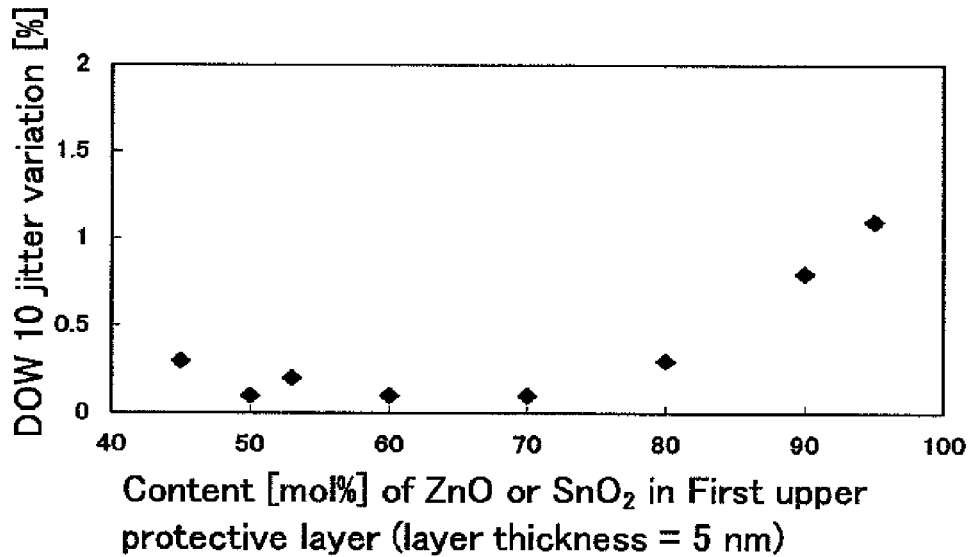
FIG. 9 is a graph showing a relation between a content of $SnO_2$ contained in the first upper protective layer of the present invention and storage stability.

Further, as shown in FIG. 9, when the content of a Zn oxide or an Sn oxide is set at 90 mol % or less in an upper protective layer, it is preferable because variation of DOW10 jitter value can be suppressed to 1% or less and the storage stability is improved. When the content of a Zn oxide or an Sn oxide is 90 mol % or more, excellent storage reliability cannot be obtained.

For a material used for an upper protective layer in a conventional single-layer phase-change optical recording medium, the upper protective layer is preferably formed of a material that is transparent, transmissive to light, has a higher melting point than the recording layer and has functions to prevent deterioration of the recording layer, to enhance the bonding strength with the recording layer and enhance the recording properties. It has been known that particularly ZnS—SiO$_2$ is preferably used for upper protective layer, and for the mixture ratio, ZnS:SiO$_2$=80:20 (molar ratio) is most preferable.

However, in the case of a multi-layered phase-change recording medium, when recording information on a first recording layer, the heat dissipation property of the first recording layer is degraded because of the thin thickness of the first reflective layer to cause a problem that there is a difficulty in recording. To avoid the problem, it is preferable to use a material having excellent thermal conductivity. When ZnS—SiO$_2$ is used for the first upper protective layer, the recording properties are degraded because of the low thermal conductivity and the storage stability after recording is poor, and thus ZnS—SiO$_2$ is not suitable for the first upper protective layer in a multi-layered phase-change optical recording medium.

Figure 10:
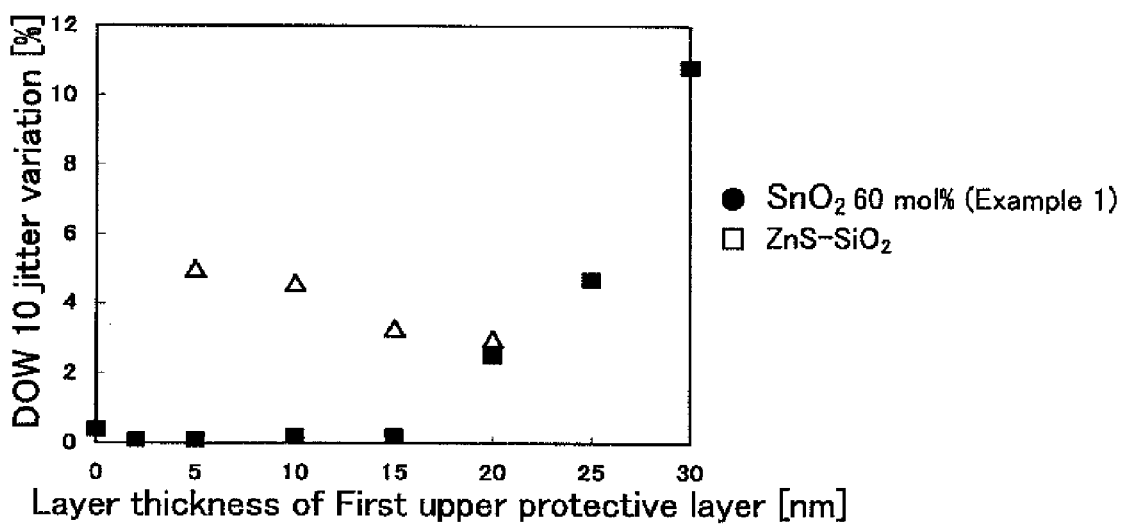
FIG. 10 is a graph showing a relation between storage stability, an upper protective layer material and a thickness of the upper protective layer.

FIG. 10 shows a result of measuring a DOW10 jitter variation obtained when a phase-change optical recording medium of Example 1 to be hereinafter described and another phase-change optical recording medium prepared in the same manner as in Example 1 except that material of the first upper protective layer was changed to ZnS—SiO$_2$ (80:20 mol %) were stored at 80° C. and a relative humidity (RH) of 85% for 100 hours. The result shown in FIG. 10 demonstrated that in the optical recording medium using ZnS—SiO$_2$, the jitter variation was not reduced irrespective to the layer thickness.

Summarizing above-mentioned results, it is preferable to use a Zn oxide and an Sn oxide having higher heat dissipation property than ZnS—SiO$_2$. When either Zn oxide or Sn oxide is used as simple material, excellent storage stability cannot be obtained. Therefore, an In oxide and an Si oxide or a Ta oxide are preferably contained therein. When these metal oxides are used for a first information layer of a multi-layered phase-change optical recording medium, high light transmittance, excellent recording properties and storage stability can be obtained because these metal oxides are transparent to light and have high thermal conductivity.

Since a first upper protective layer formed using these metal oxides can ensure a sufficient modulation degree and a sufficient reflectance with a thin layer of around 5 nm, (in, Zn, Sn) oxides, which can be sputtered by RF sputtering or DC sputtering, plus Si oxide may be used. When the use amount of Sn oxide or Zn oxide is large in a first upper protective layer, the crystallization rate of the recording layer is accelerated, and thus the recording speed can be increased.

For the second upper protective layer, ZnS—SiO$_2$ may be used as usual. The reason is that when information is recorded on the second recording layer, sufficient heat dissipation property can be obtained because the second reflective layer can be thickly formed. However, when ZnS—SiO$_2$ is used for the second upper protective layer and Ag is use for the second reflective layer, it is preferable that an interface layer formed of TiC—TiO$_2$ is inserted in between the second upper protective layer and the second reflective layer.

The layer thickness of the first upper protective layer is preferably in a range of 2 nm to 15 nm. When the first upper protective layer has a thickness thinner than 2 nm, the modulation degree is reduced due to excessively high light transmittance, and when thicker than 15 nm, it is unfavorable because the light transmittance is lowered, heat hardly escapes, and thus the recording properties are degraded.

The layer thickness of the second upper protective layer is preferably within a range of 3 nm to 30 nm. When the second upper protective layer has a thickness thinner than 3 nm, the recording properties are degraded, and when thicker than 30 nm, heat easily stays at the second upper protective layer, resulting in degraded recording properties.

In a fourth embodiment of the present invention, Cu is used as the main component for semi-transparent reflective layers of information layers other than that of an information layer disposed at the innermost side as viewed from the laser irradiation side. This configuration enables enhancing recording properties and storage stability of the first recording layer. Here, the term "main component" means that Cu is contained at 95% by weight or more. The reason why the first reflective layer containing Cu as the main component is preferable is described below.

In a phase-change optical recording medium having two layers of recording layer as shown in FIG. 1, a second information layer needs to be irradiated with as much light as possible using a recording and reproducing laser light. Therefore, a material that hardly absorbs laser light and is easily transmissive to laser light is preferably used for the first reflective layer.

Figure 11:
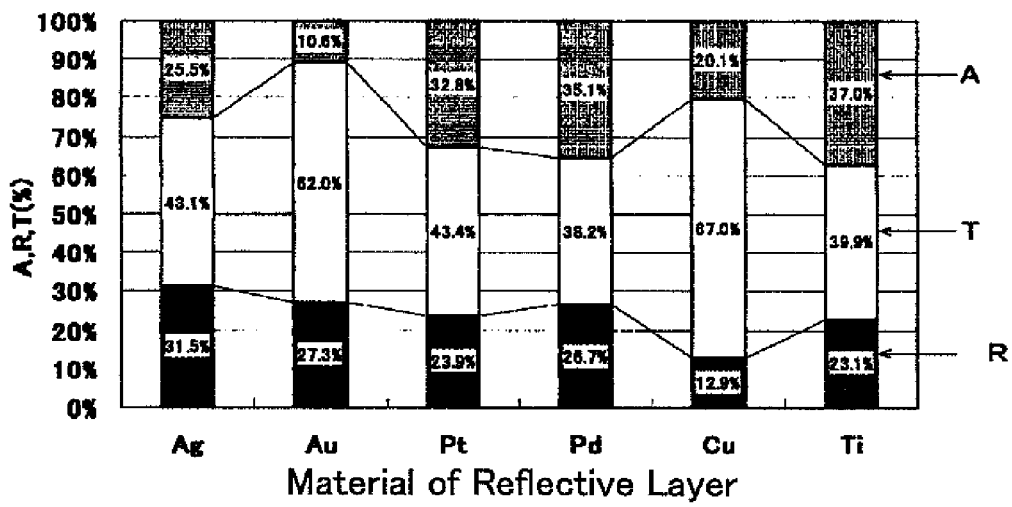
FIG. 11 is a graph showing light absorbance, reflectance and light transmittance of reflective layer materials.

Then, the present inventors measured optical properties for various types of reflective layers at a wavelength of 660 nm. Here, data of A (absorbance), R (reflectance) and T (light transmittance) was obtained. For measurement samples, polycarbonate substrates each having a thickness of 0.6 mm and covered with various metal films having a layer thickness of 10 nm formed were used. The results are shown in FIG. 11. From the results, it can be assumed that Pt, Pd and Ti are unsuitable for a first reflective layer because these materials have a low light transmittance and a high light absorbance.

Figure 12:
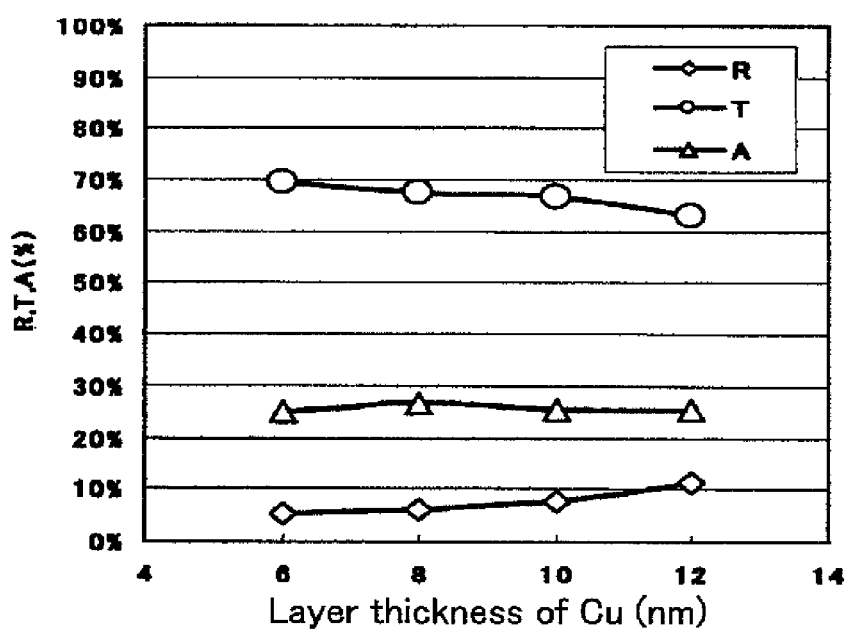
FIG. 12 is a graph showing layer-thickness dependency of light absorbance, reflectance and light transmittance of Cu measured at a wavelength of 660 nm.
Figure 13:
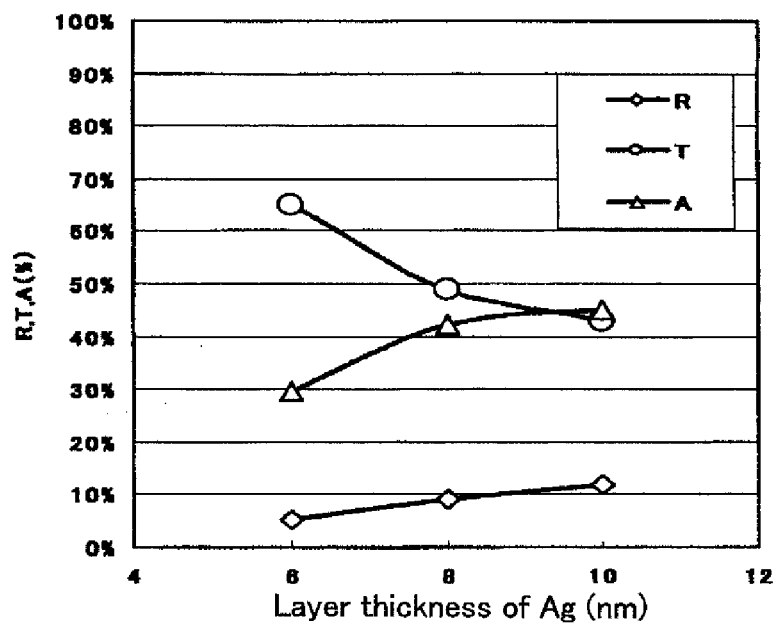
FIG. 13 is a graph showing layer-thickness dependency of light absorbance, reflectance and light transmittance of Ag measured at a wavelength of 660 nm.

Next, Cu and Ag, which has a relatively high light transmittance and a relatively low absorbance, were respectively formed on a polycarbonate substrate, A (absorbance), R (reflectance) and T (light transmittance) were measured at a wavelength of 660 nm while varying the layer thickness, the results as shown in FIG. 12 (Cu) and FIG. 13 (Ag) were obtained. The measurement results showed that Ag has greater variations by layer thickness than Cu. This shows that Cu has more excellent stability of optical constant to layer thickness of a layer formed.

Figure 14:
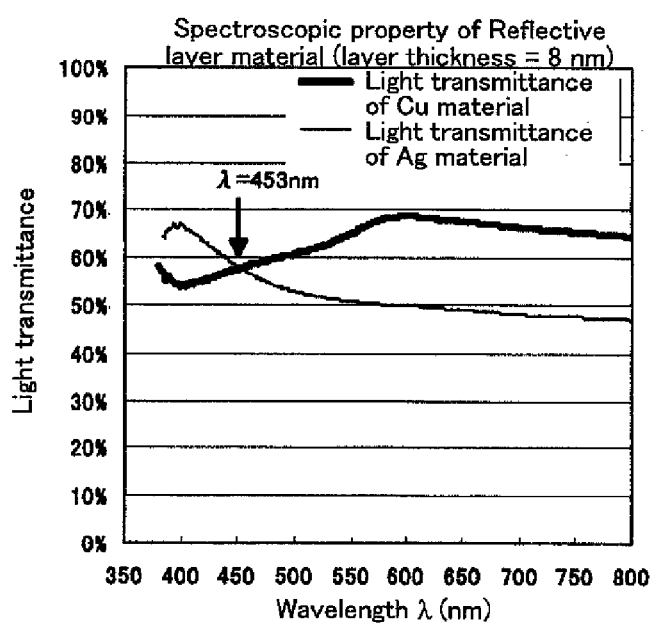
FIG. 14 is a graph showing wavelength dependency of light transmittance of Cu and Ag.

Further, FIG. 14 shows the measurement results of spectral transmittance when Ag and Cu were formed to be 8 nm in thickness. The results showed that light transmittance lines of Ag and Cu cross at a wavelength range of around 450 nm.

These facts showed that Cu has a higher light transmittance than Ag in a wavelength range longer than 450 nm or so, and Cu is preferably used to a laser light having a wavelength of around 660 nm for the first reflective layer.

Figure 15:
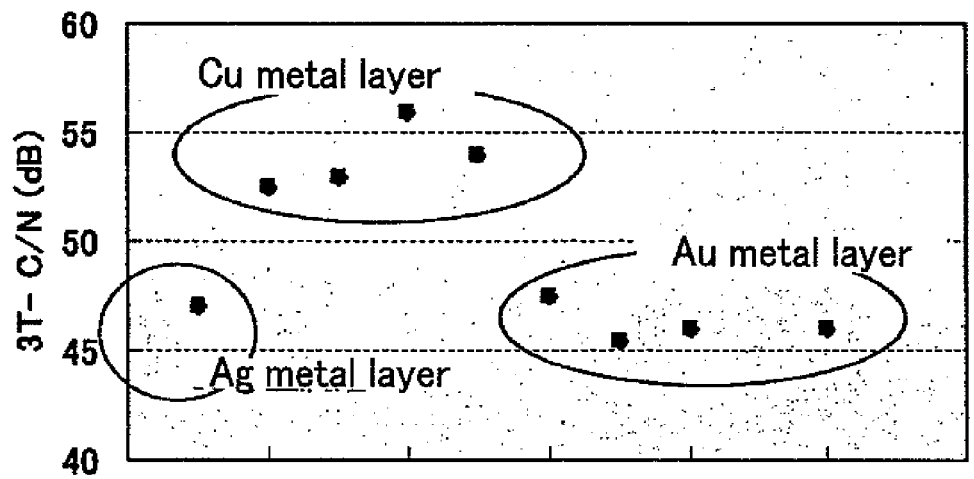
FIG. 15 is a graph showing recording properties of a first recording layer in the case where a first reflective layer is composed of Cu, Ag or Au.

Further, in respective recording media using Cu, Ag or Au for each of the first reflective layers, a 3T single pattern was recorded on the first recording layer at a wavelength of 660 nm, and the C/N ratio was measured. The results are shown in FIG. 15. The highest C/N ratio was obtained when using Cu. From the perspective of recording properties, Cu is also shown to be suitable for the first reflective layer. Note that respective plots shown in FIG. 14 are the ones that a plurality of experimental data units is arranged along the horizontal axis.

The second reflective layer is not necessarily semi-transparent, like the first reflective layer.

The layer thickness of the first reflective layer is preferably within a range of 6 nm to 12 nm. When the layer thickness is thinner than 6 nm, signal quality is degraded due to the excessively low reflectance, and repetitive recording property is degraded because the heat dissipation property is degraded. When thicker than 12 nm, it is unfavorable because the light transmittance is lowered.

The layer thickness of the second reflective layer is preferably within a range of 100 nm to 200 nm. When the layer thickness is thinner than 100 nm, sufficient heat dissipation property cannot be obtained and then repetitive recording property is degraded, and when the layer thickness thicker than 200 nm, a layer having a wasteful thickness is formed, although the heat dissipation property is unchanged, and mechanical property of the recording medium itself is degraded.

The first semi-transparent reflective layer and the second reflective layer as described above can be formed by various vapor deposition methods, for example, vacuum evaporation method, sputtering method, plasma CVD method, optical CVD method, ion-plating method and electron beam deposition method. Of these, sputtering method is excellent in mass productivity and layer quality and the like.

The first lower protective layer and the second lower protective layer are preferably formed of a material that is transparent, is transmissive to light and having a higher melting point than the recording layer and has functions to prevent deterioration of the recording layer, to enhance the bonding strength with the recording layer and enhance the recording properties. Metal oxides, nitrides, sulfides and carbides are mainly used. Specific examples thereof include metal oxides such as SiO, $SiO_2$, ZnO, $SnO_2$, $Al_2O_3$, $TiO_2$, $In_2O_3$, MgO and $ZrO_2$; nitrides such as $Si3N_4$, AlN, TiN, BN and ZrN; sulfides such as ZnS, $In_2S_3$ and $TaS_4$; carbides such as SiC, TaC, $B_4C$, WC, TiC and ZrC; diamond carbons or mixtures thereof. Each of these materials may be used alone or in combination with two or more. Further, each of these materials may contain impurities in accordance with necessity. For example, a mixture of ZnS with $SiO_2$ and a mixture of $Ta_2O_5$ with $SiO_2$ are exemplified. Particularly, $ZnS$—$SiO_2$ is often used, and the mixture ratio of $ZnS:SiO_2$=80:20 is most preferable. This material is capable of increasing light absorption efficiency of recording layers because it has a high refractive index n and an extinction coefficient of nearly zero, and this material can appropriately suppress diffusion of heat generated by light absorption because of its small thermal conductivity, and thus the use of $ZnS:SiO_2$ enables to raise the temperature of recording layers to a temperature at which the recording layers can be melted.

The layer thickness of the first lower protective layer is preferably within a range of 40 nm to 80 nm. When the first lower protective layer has a thickness thinner than 40 nm, it is unfavorable because the repetitive recording durability and recording properties are degraded and the light transmittance is lowered. When thicker than 80 nm, it is unfavorable because the light transmittance is lowered. The layer thickness is more preferably within a range of 60 nm to 80 nm. By adjusting the layer thickness of the first lower protective layer within the above-mentioned range, the repetitive recording durability is greatly enhanced.

The layer thickness of the second lower protective layer is preferably within a range of 110 nm to 160 nm. When the second lower protective layer has a thickness thinner than 110 nm, the reflectance of light from the second information layer is lowered, resulting in degraded reproducing signal quality and degraded repetitive recording durability. When thicker than 160 nm, the reflectance of light from the second information layer is lowered, resulting in degraded reproducing signal quality and degraded mechanical property of the recording medium itself.

The first and the second upper protective layers and the first and second lower protective layers described above can be formed by various vapor deposition methods, for example, vacuum evaporation method, sputtering method, plasma CVD method, optical CVD method, ion-plating method and electron beam deposition method. Of these, sputtering method is excellent in mass productivity and layer quality and the like.

A two-layered phase-change optical recording medium according to the present invention can be typically produced through a layer forming step, an initialization step and a bonding step.

In the layer forming step, a first information layer is formed on a surface of a first substrate (see FIG. 1) with a groove formed thereon, and a second information layer is formed on a surface of a second substrate with a groove formed thereon. The first information layer and the second information layer can be formed by various vapor deposition methods, for example, vacuum evaporation method, sputtering method, plasma CVD method, optical CVD method, ion-plating method and electron beam deposition method. Of these, sputtering method is excellent in mass productivity and layer quality and the like. In a sputtering method, a layer is formed with streaming an inactive gas such as argon, and at this point in time, the layer may be reactively sputtered while incorporating oxygen and nitrogen etc.

In the initialization step, the entire surface of the optical recording medium is initialized by irradiating the first information layer and the second information layer with energy light such as laser light, i.e, the recording layers are crystallized. When there is a possibility that a film floats by laser light energy during initialization step, the first information layer and the second information layer may be spin-coated with a UV curable resin etc. before the initialization step and then cured by irradiating with ultraviolet ray so as to be overcoated. Further, after the bonding step to be described below is preliminarily carried out, the first information layer and the second information layer may be initialized from the first substrate side.

In the bonding step, the first substrate and the second substrate are bonded together via an intermediate layer in a condition where the first information layer faces the second information layer. For example, a UV curable resin is applied to any one of the layer surfaces of the first information layer and the second information layer, the both substrates are pressurized and bonded in the condition where the first information layer surface and the second information layer surface face to each other, and the ultraviolet curable resin is irradiated with an ultraviolet ray to thereby cure the UV curable resin.

A three-layered phase-change optical recording medium having three information layers is produced basically in the same manner as in the two-layered phase-change optical recording medium stated above, however, since the number of information layers is increased by one, it is produced, for example, in the order of the following steps.

First, in a first layer forming step, a first information layer is formed on a first substrate, and a third information layer is formed on a second substrate.

Next, in an intermediate layer forming step, a second intermediate layer is formed on the third information layer.

Next, in a second layer forming step, a second information layer is formed on the second intermediate layer.

Next, in a bonding step, the first substrate and the second substrate are bonded together via a first intermediate layer in a condition where the first information layer and the second information layer face to each other.

Subsequently, in an initialization step, the first information layer to the third information layer are initialized in the same manner as in the two-layered phase-change optical recording medium.

The present invention can provide a multi-layered phase-change optical recording medium having excellent repetitive recording durability and excellent storage stability, in which respective information layers other than an information layer disposed at the innermost side as viewed from the laser beam irradiation side are made to have a high light transmittance to allow for recording and reproducing information on the respecting information layers with stable tracking accuracy.

EXAMPLES

Hereinafter, the present invention will be further described in detail referring to specific Examples, however, the present invention is not limited to the disclosed Examples.

Figure 16:
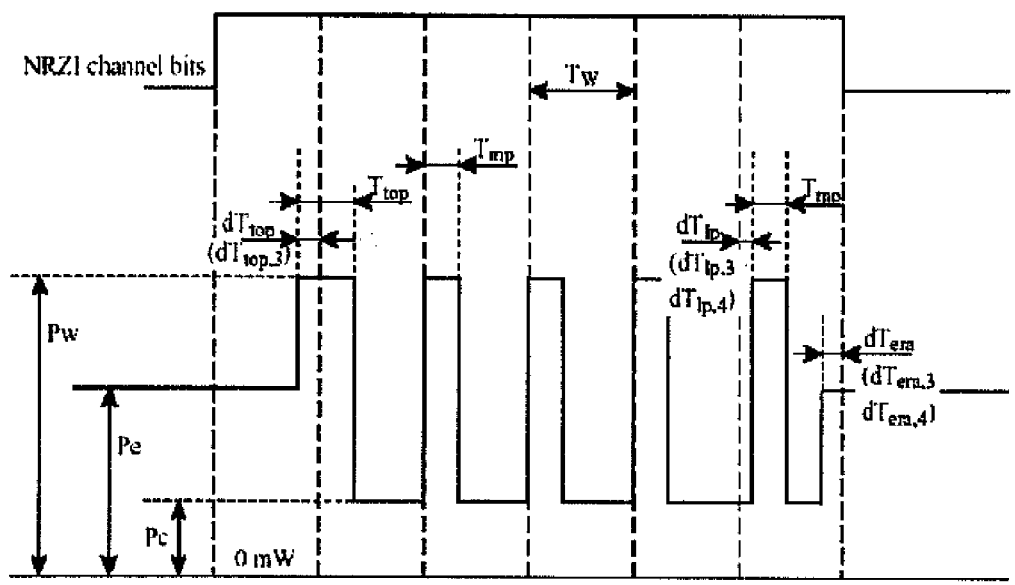
FIG. 16 is an illustration showing a 1T cycle recording strategy for recording information on L0 layer.
Figure 17:
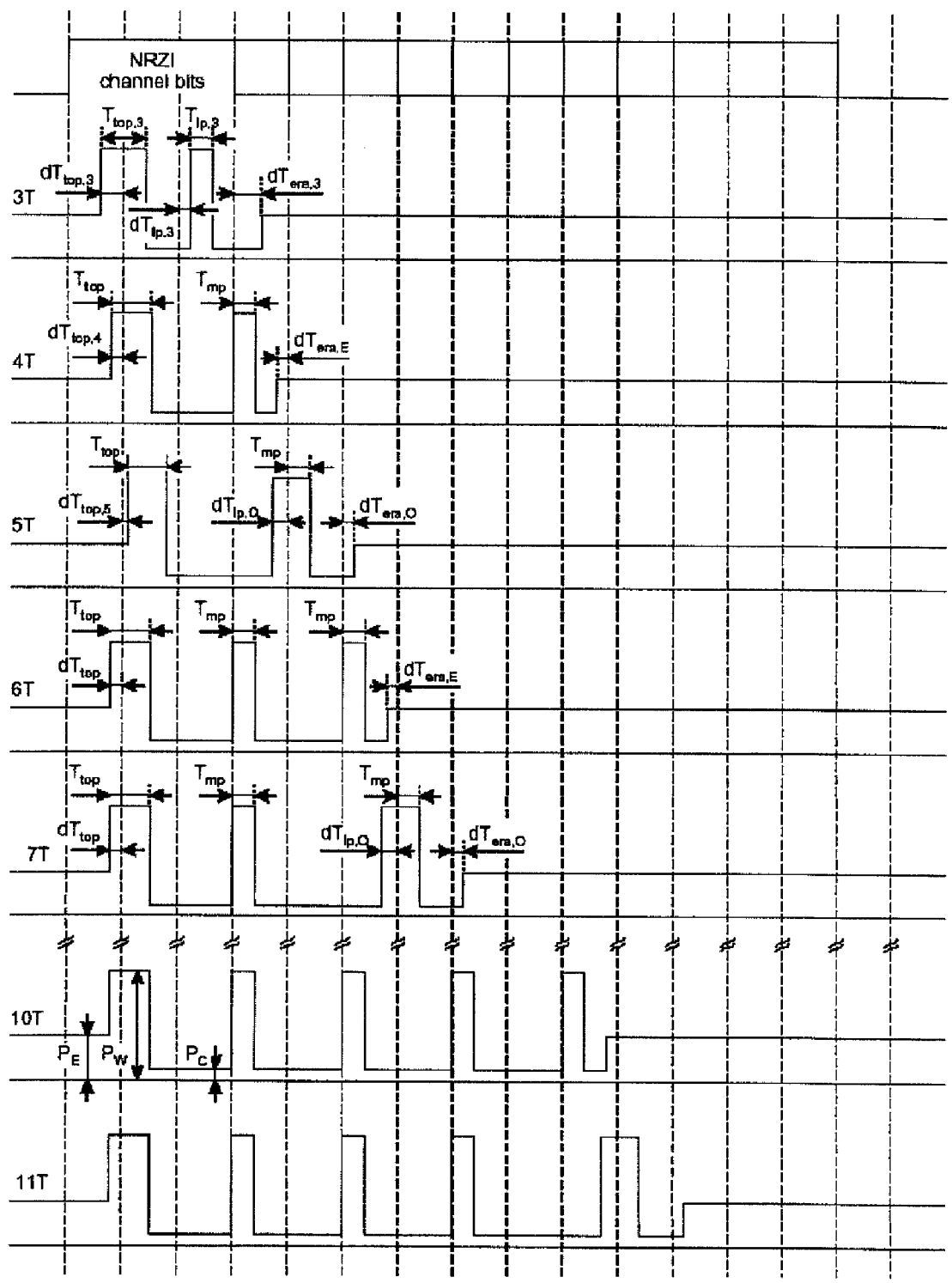
FIG. 17 is an illustration showing a 2T cycle recording strategy for recording information on L1 layer.

For an evaluation apparatus, ODU1000 manufactured by PULSTEC INDUSTRIAL CO., LTD was used. A laser wavelength used to irradiate recording layers at the time of recording was 660 nm, and a numerical aperture (NA) of an objective lens was 0.65. A recording linear velocity used at the time of recording was 9.2 m/s, and recorded information was reproduced with a reproducing light power of 1.2 mW. For a light waveform generation unit, MSG3A manufactured by PULSTEC INDUSTRIAL CO., LTD was used. As to recording method, for a first information layer (L0 layer) disposed at the front side as viewed from the laser beam irradiation side, 1T cycle recording strategy was used, and for a second information layer (L1 layer) disposed at the innermost side as viewed from the laser beam irradiation side, 2T cycle recording strategy was used. The recording strategies used in the test are shown in FIG. 16 and FIG. 17, and parameters used in the test are shown in Tables 7-A and 7-B. The wording "∈1" shown in Tables 7-A and 7-B represents a ratio (Pe/Pw) of an erasing power Pe to a recording power Pw. In FIG. 17, "dTx" is expressed as a positive value when leading to the related clock edge, and is expressed as a negative value when lagging to the related clock edge.

Example 1

On a first substrate composed of a polycarbonate resin having a diameter of 12 cm, a thickness of 0.575 mm, and having convexo-concaves (groove depth: $\lambda/11.5n$)($n=1.55$) of a tracking guide formed with a serpentine continuous groove with a track pitch of 0.74 μm and having a groove width of convex portions (groove) of 0.25 μm on one surface thereof, a first lower protective layer composed of $ZnS-SiO_2$ (80:20 (mol %)) having a layer thickness of 70 nm was formed by RF magnetron sputtering method under the conditions of a sputtering power of 4 kW and an Ar flow rate of 15 sccm.

Next, on the first lower protective layer, a first recording layer composed of $Ag_{0.2}In_{3.5}Ge_7Sb_{68.7}Te_{20.6}$ having a layer thickness of 7.5 nm was formed by DC magnetron sputtering method under the conditions of a sputtering power of 0.4 kW and an Ar flow rate of 35 sccm.

Next, on the first recording layer, a first upper protective layer composed of $In_2O_3-ZnO-SnO_2-Ta_2O_5$ (7.5:22.5:60:10 (mol %)) having a layer thickness of 5 nm was formed by RF magnetron sputtering method under the conditions of a sputtering power of 1 kW and an Ar flow rate of 15 sccm.

Next, on the first upper protective layer, a first semi-transparent reflective layer composed of Cu—Mo (1.1 mol %) having a layer thickness of 8 nm was formed by DC magnetron sputtering method under the conditions of a sputtering power of 0.5 kW and an Ar flow rate of 20 sccm.

Next, on the first semi-transparent reflective layer, a thermal diffusion layer composed of $In_2O_3-ZnO-SnO_2-SiO_2$ (8.8:41.7:35.2:14.3 (mol %)) having a layer thickness of 65 nm was formed by DC magnetron sputtering method under the conditions of a sputtering power of 2 kW and an Ar flow rate of 15 sccm to thereby form a first information layer (L0 layer).

In the meanwhile, on a second substrate composed of a polycarbonate resin having a diameter of 12 cm, a thickness of 0.6 mm, and having convexo-concaves (groove depth: $\lambda/11.5n$) ($n=1.55$) of a tracking guide formed with a serpentine continuous groove with a track pitch of 0.74 μm and having a groove width of convex portions (groove) of 0.24 μm on one surface thereof, a second reflective layer composed of Ag having a layer thickness of 40 nm was formed by DC magnetron sputtering method under the conditions of a sputtering power of 3 kW and an Ar flow rate of 15 seem.

Next, on the second reflective layer, an interface layer composed of $TiC-TiO_2$ (70:30 (mol %)) having a layer thickness of 4 nm was formed by DC magnetron sputtering method under the conditions of a sputtering power of 2 kW and an Ar flow rate of 15 seem.

Next, on the interface layer, a second upper protective layer composed of $ZnS-SiO_2$ (80:20 mol %) having a layer thickness of 20 nm was formed by RF magnetron sputtering method under the conditions of a sputtering power of 1.5 kW and an Ar flow rate of 15 sccm.

Next, on the second upper protective layer, a second recording layer composed of $Ag_{0.2}In_{3.5}Sb_{71.4}Te_{21.4}Ge_{3.5}$ having a layer thickness of 15 nm was formed by DC magnetron sputtering method under the conditions of a sputtering power of 0.4 kW and an Ar flow rate of 35 sccm.

Next, on the second recording layer, a second lower protective layer composed of $ZnS-SiO_2$ (80:20 mol %) having a layer thickness of 140 nm was formed by RF magnetron sputtering method under the conditions of a sputtering power of 4 kW and an Ar flow rate of 15 sccm to thereby form a second information layer (L1 layer).

For a sputtering apparatus, DVD SPRINTER manufactured by Unaxis Japan Co., Ltd. was used.

Next, an ultraviolet curable resin (KARAYAD DVD802, manufactured by Nippon Kayaku Co., Ltd.) was applied over the layer surface of the first information layer, the layer surface of the second information layer was bonded to the layer surface of the first information layer, and the first information layer and the second information layer were bonded by spin-coating. Then, the ultraviolet curable resin was irradiated with an ultraviolet ray for curing to form an intermediate layer having a layer thickness of 50 μm, thereby a two-layered phase-change optical recording medium having two information layers as shown in FIG. 1 was prepared.

Next, the two-layered phase-change optical recording medium was irradiated with a laser beam in the order of the second information layer and the first information layer to initialize the information layers. The first recording layer and the second recording layer were initialized by converging a laser beam emitted from a semiconductor laser (emission wavelength 810±10 nm) onto the recording layers by an optical pickup (NA=0.55). For conditions for initializing the second recording layer, the disc was rotated in CLV (constant leaner velocity) mode at a linear velocity of 7 m/s, a feed rate of 40 μm/revolution, a radius position of 22 mm to 59 mm, with an initialization power of 2,000 mW. For conditions for initializing the first recording layer, the disc was rotated in CLV (constant leaner velocity) mode at a linear velocity of 6 m/s, a feed rate of 60 μm/revolution, a radius position of 22 mm to 59 mm with an initialization power of 1,100 mW.

For the reflectance of the crystalline phase after the initialization, the L0 layer had a reflectance of 6.2%, the L1 layer had a reflectance of 5.8%, and the two-layered phase-change optical recording medium had well-balanced reflectance.

Examples 2 to 13 and Comparative Examples 1 to 4

Two-layered phase-change optical recording media each having the same substrates and the same layer configuration as those of Example 1 were prepared except that the material composition of the thermal diffusion layer (light transmissive layer) was changed to the material composition shown in Table 1. The two-layered phase-change optical recording media were tested.

The acceptance level of light transmittance of the first information layer was determined to be 42%. Further, to determine the reliability of repetitive recording durability, a jitter value (DOW 500 jitter) after repeatedly recording at 500 times was evaluated. The acceptance level of jitter value was determined to be 10%.

Table 1 shows the evaluation results, and when Sn oxide and Si oxide were not contained in the material composition for thermal diffusion layer, the light transmittance and the DOW 10 jitter were not within acceptable level. When In oxide was contained at 3 mol % or less, the DOW 500 jitter value was increased, although the light transmittance was excellent. When In oxide was contained at 50 mol % or more, the light transmittance tended to be lowered, although the DOW 500 jitter value was decreased. Further, when Si oxide was contained at 30 mol % or more, the sputtering rate tended to be lowered.

Examples 14 to 40 and Comparative Examples 5 to 13

Two-layered phase-change optical recording media of Examples 14 to 40 and Comparative Examples 5 to 13 were prepared in the same manner as in Example 1, except that the groove depths of the first and the second substrates were changed to values shown in Tables 2-A, 2-B and 2-C. There is a tendency that the shallower the groove depth is, the higher the reflectance is, however, actually, there was little difference in reflectance with the groove depths employed in Examples, the reflectances of the L0 layer and L1 layer were well balanced in any of the optical recording media of Examples 14, 23 and 32 respectively formed with a deep groove and the optical recording media of Example 22, 31 and 40 respectively formed with a shallow groove.

The two-layered phase-change optical recording media of Examples 14 to 40 and Comparative Examples 5 to 13 were evaluated with a laser wavelength of 660 nm, 645 nm and 665 nm, respectively. Tables 2-A, 2-B and 2-C show the evaluation results. When the groove depth was shallower than the lower limit value ($\lambda/17n$) as in the optical recording media of Comparative Examples 6 to 7, 9 to 10 and 12 to 13, the amplitude of a push-pull signal was decreased, and stable tracking accuracy could not be obtained. When the groove depth was deeper than the upper limit value ($\lambda/11.5n$) as in the optical recording media of Comparative Examples 5, 8 and 11, the jitter value was increased.

Marks were repeatedly recorded 10 times at three adjacent tracks in the recording layer and, of these three tracks, the middle track was reproduced to evaluate properties of optical recording media of Examples 14 to 40 and Comparative Examples 5 to 13. The evaluation of properties was carried out based on a jitter obtained when 3T to 11T and 14T marks and spaces were randomly recorded. The "jitter" represents a time deviation between boundary and time clock when reflectance levels of marks and spaces were binarized on a specific slice level. The lower the jitter value is, the more excellent the recording property is. The acceptance level of jitter value was 9% or less. The modulation degree after recording was measured, and both the L0 layer and L1 layer had a modulation degree of 63%. As to the recording power Pw at that time, the recording power (Pw) of the L0 layer was 36 mW, and the recording power (Pw) of the L1 layer was 38 mW. A modulation degree is the one represented by (Rtop−Rbot)/Rtop when the reflectance of a crystalline phase is represented by Rtop and the reflectance of an amorphous phase is represented by Rbot.

Figure 5:
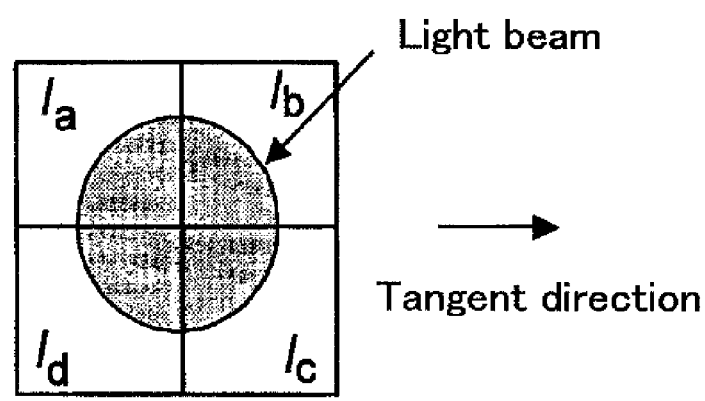
FIG. 5 is an illustration of a photo-detector.

The push-pull signals shown in Tables 2-A, 2-B and 2-C are the ones that $[(1a+1b)-(1c+1d)]/[1a+1b+1c+1d]$ are measured using a photodetector shown in FIG. 5. The frequency was filtered with a low-pass filter having a cutoff frequency of 30 kHz (−3 dB) so that serpentine wobble frequency components (about 820 kHz) and other noise components were not mixed at the time of measurement. The acceptance level of push-pull signal was determined to be 0.28 or more.

The same results could also be obtained with the optical recording media of Examples 2 to 13 in which each of the material of the thermal diffusion layer (light transmissive layer) was changed.

Examples 41 to 49 and Reference Examples 14 to 18

Two-layered optical recording media each having the same substrates and the same layer configuration as those of Example 1 were prepared, except that the material composition of the recording layer was changed to the material composition shown in Table 3. The prepared optical recording media were tested as to recording properties and storage stability.

A jitter (DOW10 jitter) after repeatedly recording 10 times at a recording linear velocity of 9.2 m/s was measured, a jitter value less than 10% was evaluated as "A" and a jitter value of 10% or more was evaluated as "B". Further, when a jitter variation obtained after being left at 80° C. for 300 hours was less than 2%, it was evaluated as "A", and when a jitter variation obtained after being left at 80° C. for 300 hours was 2% or more, it was evaluated as "B". The two-layered phase-change optical recording medium was stored in a thermostatic bath set at 80° C. and a relative humidity of 85% for 300 hours to thereby carry out the storage test.

As can be seen from Table 3, when the content of Ge was smaller than 2%, the storage stability of the optical recording medium was degraded because of the low crystallization temperature. When the content of Ge was greater than 20%, the repetitive recording property of the optical recording medium was degraded, although the crystallization temperature was sufficiently high. It can be considered that when the content of Sb is smaller than 60%, high-speed recording cannot be carried out because of its low transition linear velocity at the recording layer. When the content of Sb was greater than 75%, recording could not be done because of its excessively high transition linear velocity, and the storage stability of the optical recording medium was poor because the crystallization temperature was decreased. When the content of Te was smaller than 6%, it was difficult to initialize the recording layer, and the jitter value was increased. When the content of Te was greater than 30%, the transition linear velocity was slow and the recording properties tended to be degraded Examples 50 to 65

Two-layered phase-change optical recording media each having the same substrates and the same layer configuration as those of Example 1, except that the material composition of the first upper protective layer was changed to the composition as shown in Tables 4 and 5. The prepared optical recording media were tested.

A transition linear velocity of the first information layer and a jitter value obtained after repeatedly recording 10 times were evaluated. The evaluation results showed that the sputtering rate was almost the same, however, when any one of ZnO or $SnO_2$ was contained at 50 mol % or more, the recording properties of the optical recording medium were enhanced because the transition linear velocity was improved.

Example 1 and 66 to 77

Two-layered phase-change optical recording media each having the same substrates and the same layer configuration as those of Example 1, except that the material composition of the first semi-transparent reflective layer was changed to the material shown in Table 6. The prepared optical recording media were tested.

The measurement results of Examples 66 to 77 were shown together with the results of Example 1 in Table 6. The jitter variation of the optical recording media after being stored at 80° C. and a relative humidity of 85% for 300 hours was evaluated, and any of the optical recording media had a jitter variation less than 1%.

TABLE 1

| Material composition for thermal diffusion layer | $In_2O_3$ (a) | ZnO (b) | $SnO_2$ (c) | $SiO_2$ (d) | Light transmittance (%) | Recording linear velocity 9.2 m/s DOW 500 jitter | DC sputtering rate [nm/sec] Power: 2 kW, Ar flow rate: 15 sccm |
|---|---|---|---|---|---|---|---|
| Ex. 1 | 8.8 | 41.7 | 35.2 | 14.3 | 44.2 | 9.3 | 7.73 |
| Ex. 2 | 12 | 80 | 8 | — | 43.6 | 9.9 | 8.38 |
| Ex. 3 | 16 | 14 | 70 | — | 43.8 | 9.8 | 9.86 |
| Ex. 4 | 9 | 40 | 36 | 15 | 44.1 | 9.4 | 7.52 |
| Ex. 5 | 9 | 30 | 46 | 15 | 44 | 9.3 | 7.56 |
| Ex. 6 | 7.5 | 22.5 | 60 | 10 | 43.8 | 9.3 | 7.61 |
| Ex. 7 | 3 | 40 | 40 | 17 | 43.9 | 9.4 | 6.85 |
| Ex. 8 | 5 | 45 | 30 | 20 | 43.8 | 9.3 | 6.75 |
| Ex. 9 | 5 | 35 | 30 | 30 | 43.5 | 9.7 | 6.55 |
| Ex. 10 | 20 | 42 | 35 | 3 | 43 | 9.2 | 7.95 |
| Ex. 11 | 30 | 37 | 29 | 4 | 42.7 | 9.5 | 8.10 |
| Ex. 12 | 40 | 29 | 27 | 4 | 42.4 | 9.4 | 8.19 |
| Ex. 13 | 50 | 22 | 24 | 4 | 42 | 9.6 | 8.29 |
| Compara. Ex. 1 | 90 | 10 | — | — | 40 | 10.8 | 8.54 |
| Compara. Ex. 2 | 1 | 40 | 50 | 9 | 43.2 | 10.3 | 5.89 |
| Compara. Ex. 3 | 9 | 17 | 39 | 35 | 43.3 | 10.4 | 5.56 |
| Compara. Ex. 4 | 55 | 20 | 21 | 4 | 41.7 | 9.8 | 8.32 |

TABLE 2-A

| | Expression of groove depth | λ [nm] | Groove depth [nm] | Push-pull signal L0 layer | Push-pull signal L1 layer | DOW 10 jitter [%] L0 layer | DOW 10 jitter [%] L1 layer |
|---|---|---|---|---|---|---|---|
| Compara. Ex. 5 | λ/(11 n) | 660 | 38.7 | 0.48 | 0.47 | 10 | 7.7 |
| Ex. 14 | λ/(11.5 n) | 660 | 37.0 | 0.44 | 0.44 | 9 | 7.6 |
| Ex. 15 | λ/(12 n) | 660 | 35.5 | 0.41 | 0.41 | 8.4 | 7.5 |
| Ex. 16 | λ/(12.5 n) | 660 | 34.1 | 0.38 | 0.39 | 7.4 | 7.4 |
| Ex. 17 | λ/(13 n) | 660 | 32.8 | 0.36 | 0.37 | 7 | 7.3 |
| Ex. 18 | λ/(14 n) | 660 | 30.4 | 0.35 | 0.35 | 6.9 | 7.3 |
| Ex. 19 | λ/(14.5 n) | 660 | 29.4 | 0.32 | 0.33 | 6.9 | 7.4 |
| Ex. 20 | λ/(15 n) | 660 | 28.4 | 0.3 | 0.31 | 7 | 7.3 |
| Ex. 21 | λ/(16 n) | 660 | 26.6 | 0.29 | 0.3 | 6.9 | 7.3 |
| Ex. 22 | λ/(17 n) | 660 | 25.0 | 0.28 | 0.29 | 6.9 | 7.4 |
| Compara. Ex. 6 | λ/(17.5 n) | 660 | 24.3 | 0.26 | 0.27 | 7 | 7.4 |
| Compara. Ex. 7 | λ/(18 n) | 660 | 23.7 | 0.24 | 0.25 | 7.1 | 7.5 |

TABLE 2-B

| | Expression of groove depth | λ [nm] | Groove depth [nm] | Push-pull signal L0 layer | Push-pull signal L1 layer | DOW 10 jitter [%] L0 layer | DOW 10 jitter [%] L1 layer |
|---|---|---|---|---|---|---|---|
| Compara. Ex. 8 | λ/(11 n) | 645 | 37.8 | 0.47 | 0.46 | 9.6 | 7.8 |
| Ex. 23 | λ/(11.5 n) | 645 | 36.2 | 0.43 | 0.43 | 9 | 7.7 |

TABLE 2-B-continued

|  | Expression of groove depth | λ [nm] | Groove depth [nm] | Push-pull signal L0 layer | Push-pull signal L1 layer | DOW 10 jitter [%] L0 layer | DOW 10 jitter [%] L1 layer |
|---|---|---|---|---|---|---|---|
| Ex. 24 | λ/(12 n) | 645 | 34.7 | 0.4 | 0.4 | 8.5 | 7.6 |
| Ex. 25 | λ/(12.5 n) | 645 | 33.3 | 0.39 | 0.39 | 7.6 | 7.5 |
| Ex. 26 | λ/(13 n) | 645 | 32.0 | 0.37 | 0.37 | 7.2 | 7.4 |
| Ex. 27 | λ/(14 n) | 645 | 29.7 | 0.37 | 0.34 | 7 | 7.4 |
| Ex. 28 | λ/(14.5 n) | 645 | 28.7 | 0.35 | 0.32 | 7 | 7.5 |
| Ex. 29 | λ/(15 n) | 645 | 27.7 | 0.32 | 0.3 | 7.2 | 7.4 |
| Ex. 30 | λ/(16 n) | 645 | 26.0 | 0.29 | 0.3 | 7 | 7.4 |
| Ex. 31 | λ/(17 n) | 645 | 24.5 | 0.28 | 0.29 | 7.1 | 7.5 |
| Compara. Ex. 9 | λ/(17.5 n) | 645 | 23.8 | 0.26 | 0.27 | 7.1 | 7.6 |
| Compara. Ex. 10 | λ/(18 n) | 645 | 23.1 | 0.25 | 0.26 | 7.2 | 7.7 |

TABLE 2-C

|  | Expression of groove depth | λ [nm] | Groove depth [nm] | Push-pull signal L0 layer | Push-pull signal L1 layer | DOW 10 jitter [%] L0 layer | DOW 10 jitter [%] L1 layer |
|---|---|---|---|---|---|---|---|
| Compara. Ex. 11 | λ/(11 n) | 665 | 39.0 | 0.46 | 0.45 | 9.8 | 7.9 |
| Ex. 32 | λ/(11.5 n) | 665 | 37.3 | 0.44 | 0.44 | 9 | 7.7 |
| Ex. 33 | λ/(12 n) | 665 | 35.8 | 0.41 | 0.41 | 8.5 | 7.7 |
| Ex. 34 | λ/(12.5 n) | 665 | 34.3 | 0.38 | 0.39 | 7.5 | 7.5 |
| Ex. 35 | λ/(13 n) | 665 | 33.0 | 0.36 | 0.37 | 7.1 | 7.6 |
| Ex. 36 | λ/(14 n) | 665 | 30.6 | 0.35 | 0.35 | 7.2 | 7.4 |
| Ex. 37 | λ/(14.5 n) | 665 | 29.6 | 0.32 | 0.33 | 7.1 | 7.4 |
| Ex. 38 | λ/(15 n) | 665 | 28.6 | 0.3 | 0.31 | 7 | 7.3 |
| Ex. 39 | λ/(16 n) | 665 | 26.8 | 0.29 | 0.3 | 7.1 | 7.4 |
| Ex. 40 | λ/(17 n) | 665 | 25.2 | 0.28 | 0.29 | 7.1 | 7.5 |
| Compara. Ex. 12 | λ/(17.6 n) | 665 | 24.5 | 0.26 | 0.27 | 7.2 | 7.5 |
| Compara. Ex. 13 | λ/(18 n) | 665 | 23.8 | 0.26 | 0.26 | 7.1 | 7.5 |

TABLE 3

| Material composition for recording layer | Ge | Sb | Te | Ag | In | SUM | Recording linear velocity 9.2 m/s DOW 10 jitter [%] | After storing at 80° C. for 300 hours Jitter variation [%] |
|---|---|---|---|---|---|---|---|---|
| Ex. 41 | 2 | 68.7 | 25.6 | 0.2 | 3.5 | 100 | A | A |
| Ex. 42 | 5 | 68.7 | 22.6 | 0.2 | 3.5 | 100 | A | A |
| Ex. 43 | 7 | 68.7 | 20.6 | 0.2 | 3.5 | 100 | A | A |
| Ex. 44 | 14 | 68.7 | 13.6 | 0.2 | 3.5 | 100 | A | A |
| Ex. 45 | 20 | 70.3 | 6 | 0.2 | 3.5 | 100 | A | A |
| Ex. 46 | 7 | 60 | 29.3 | 0.2 | 3.5 | 100 | A | A |
| Ex. 47 | 7 | 63 | 26.3 | 0.2 | 3.5 | 100 | A | A |
| Ex. 48 | 7 | 75 | 14.3 | 0.2 | 3.5 | 100 | A | A |
| Ex. 49 | 5.3 | 61 | 30 | 0.2 | 3.5 | 100 | A | A |
| Reference Ex. 14 | 1 | 68.7 | 26.6 | 0.2 | 3.5 | 100 | A | B |
| Reference Ex. 15 | 25 | 68.3 | 3 | 0.2 | 3.5 | 100 | B | A |
| Reference Ex. 16 | 7 | 58 | 31.3 | 0.2 | 3.5 | 100 | B | B |
| Reference Ex. 17 | 7 | 77 | 12.3 | 0.2 | 3.5 | 100 | B | B |
| Reference Ex. 18 | 15 | 79.3 | 2 | 0.2 | 3.5 | 100 | B | B |

TABLE 4

| Material composition for upper protective layer | $In_2O_3$ | ZnO | $SnO_2$ | $Ta_2O_5$ | Transition linear velocity of recording layer [m/s] | Recording linear velocity 9.2 m/s DOW 10 jitter [%] | DC sputtering rate [nm/sec] Power: 2 kW Ar flow rate: 15 sccm |
|---|---|---|---|---|---|---|---|
| Ex. 50 | 7.5 | 22.5 | 60 | 10 | 21 | 7 | 3.72 |
| Ex. 51 | 9.2 | 27.5 | 53.3 | 10 | 20 | 7.2 | 3.88 |
| Ex. 52 | 7.5 | 22.5 | 50 | 20 | 17 | 8.1 | 3.67 |
| Ex. 53 | 7.5 | 27.5 | 45 | 20 | 15 | 9 | 3.66 |
| Ex. 54 | 7.5 | 60 | 22.5 | 10 | 21 | 6.9 | 3.57 |
| Ex. 55 | 9.2 | 53.3 | 27.5 | 10 | 20 | 7.3 | 3.73 |
| Ex. 56 | 7.5 | 50 | 22.5 | 20 | 17 | 8.2 | 3.52 |
| Ex. 57 | 7.5 | 45 | 27.5 | 20 | 15 | 9 | 3.51 |

TABLE 5

| Material composition for upper protective layer | $In_2O_3$ | ZnO | $SnO_2$ | $SiO_2$ | Transition linear velocity of recording layer [m/s] | Recording linear velocity 9.2 m/s DOW 10 jitter [%] | DC sputtering rate [nm/sec] Power: 2 kW Ar flow rate: 15 sccm |
|---|---|---|---|---|---|---|---|
| Ex. 58 | 7.5 | 22.5 | 60 | 10 | 21 | 7.1 | 7.61 |
| Ex. 59 | 9.2 | 27.5 | 53.3 | 10 | 20 | 7.2 | 7.59 |
| Ex. 60 | 7.5 | 22.5 | 50 | 20 | 17 | 8 | 6.78 |
| Ex. 61 | 7.5 | 27.5 | 45 | 20 | 15 | 8.8 | 6.65 |
| Ex. 62 | 7.5 | 60 | 22.5 | 10 | 21 | 7 | 7.46 |
| Ex. 63 | 9.2 | 53.3 | 27.5 | 10 | 20 | 7.1 | 7.44 |
| Ex. 64 | 7.5 | 50 | 22.5 | 20 | 17 | 8 | 6.63 |
| Ex. 65 | 7.5 | 45 | 27.5 | 20 | 15 | 8.9 | 6.50 |

TABLE 6

|  | Added metal | % by weight | Jitter variation [%] |
|---|---|---|---|
| Ex. 1 | Mo | 1.1 | 0.15 |
| Ex. 66 | Ta | 2.0 | 0.2 |
| Ex. 67 | Nb | 1.0 | 0.6 |
| Ex. 68 | Cr | 0.6 | 0.6 |
| Ex. 69 | Zr | 1.0 | 0.4 |
| Ex. 70 | Ni | 0.7 | 0.7 |
| Ex. 71 | Ge | 0.8 | 0.75 |
| Ex. 72 | Zr | 0.3 | 0.9 |
| Ex. 73 | Ge | 0.2 | 0.9 |
| Ex. 74 | Au | 2.2 | 0.85 |
| Ex. 75 | Mo | 4.0 | 0.5 |
| Ex. 76 | Mo | 5.0 | 0.7 |
| Ex. 77 | Not added | 0.0 | 0.9 |

TABLE 7-A

Recording strategy for L0 layer

| Parameter | Value | Unit |
|---|---|---|
| Tmp | 3/16 | T |
| Ttop | 3/16 | T |
| dTtop | 10/16 | T |
| dTtop, 3 | 8/16 | T |
| dTlp | −8/16 | T |
| dTlp, 3 | −7/16 | T |
| dTlp, 4 | −7/16 | T |
| dTera | 5/16 | T |
| dTera, 3 | 5/16 | T |
| dTera, 4 | 5/16 | T |
| ε1 | 0.18 | — |

TABLE 7-B

Recording strategy for L1 layer

| Parameter | Value | Unit |
|---|---|---|
| Tmp | 12/16 | T |
| Ttop | 15/16 | T |
| Ttop, 3 | 15/16 | T |
| dTtop | 3/16 | T |
| dTtop, 3 | 3/16 | T |
| dTtop, 4 | 3/16 | T |
| dTtop, 5 | 3/16 | T |
| dTera, 3 | 10/16 | T |
| dTera, O | 1/16 | T |
| dTera, E | 1/16 | T |
| dTlp, O | 0/16 | T |
| Tlp, 3 | 0/16 | T |
| dTlp, 3 | 0/16 | T |
| ε1 | 0.42 | — |

Example 78

Figure 18:
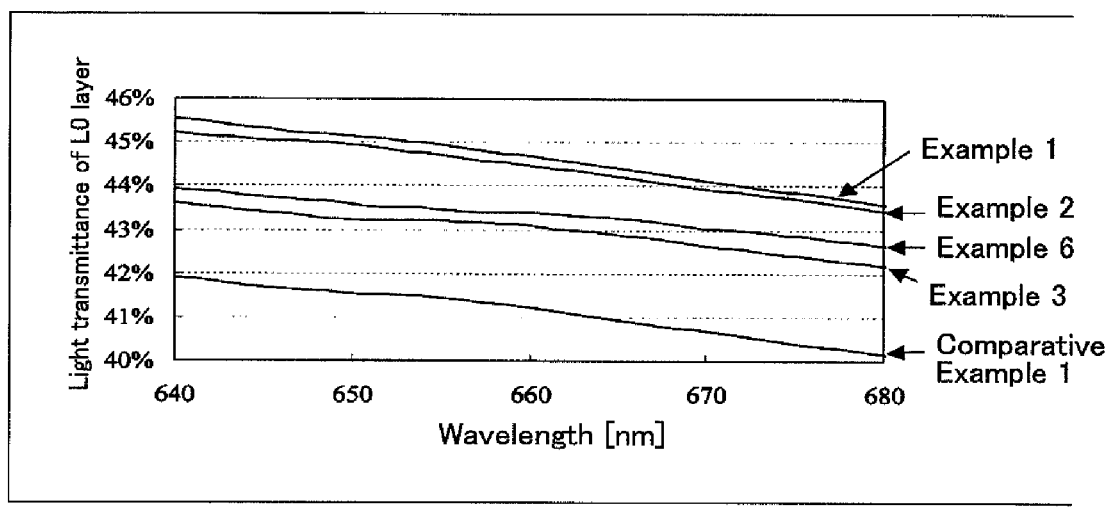
FIG. 18 is an illustration showing measurement results of light transmittance of the first information layer (L0 layer) within a wavelength range of 640 nm to 680 nm for the two-layered phase-change optical recording media prepared in Examples 1 to 3, 6, and Comparative Example 1.
Figure 19:
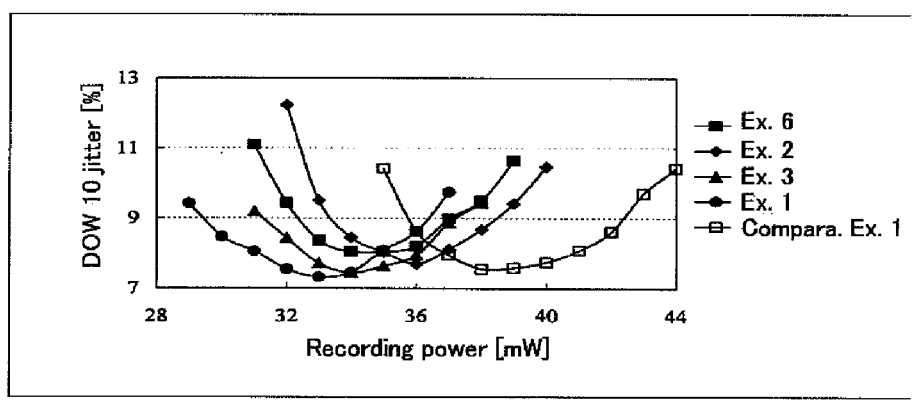
FIG. 19 is a graph showing measurement results of a relation between recording power and DOW10 jitter for the two-layered phase-change optical recording media prepared in Examples 1 to 3, 6 and Comparative Example 1.

For the respective two-layered phase-change optical recording media prepared in Examples 1 to 3, 6 and Comparative Example 1, a light transmittance of the first information layer (L0 layer) within a wavelength range of 640 nm to 680 nm was measured. FIG. 18 shows the measurement results of the light transmittance. FIG. 19 shows measurement results of a relation between recording power and DOW10 jitter for the two-layered phase-change optical recording media.

Figure 20:
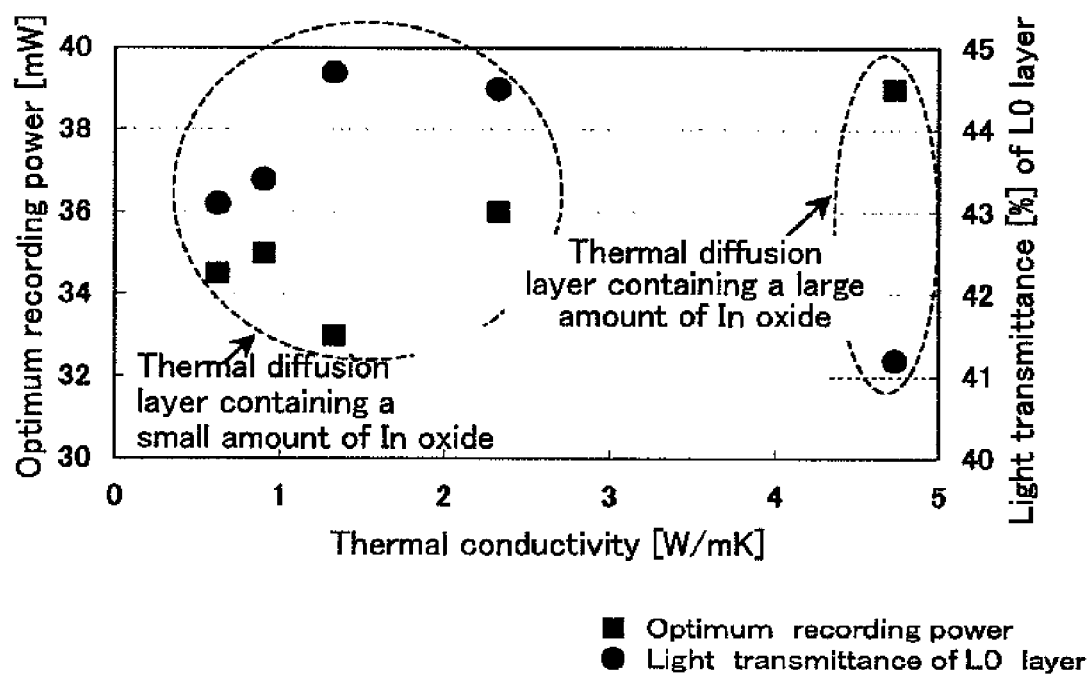
FIG. 20 is a graph showing a relation between thermal conductivity of the thermal diffusion layer (light transmissive layer) of the respective two-layered phase-change optical recording media prepared in Examples 1 to 3, 6 and Comparative Example 1, the optimum recording power obtained in FIG. 19, and light transmittance of each of the L0 layers measured at a wavelength of 660 nm obtained in FIG. 18.

Further, FIG. 20 shows a relation between thermal conductivity of the thermal diffusion layer (light transmissive layer) of the respective two-layered phase-change optical recording media, the optimum recording power obtained in FIG. 19 (a recording power with which the lowest jitter value was obtained), and light transmittance of each of the L0 layers measured at a wavelength of 660 nm obtained in FIG. 18.

The results shown in FIG. 20 verified that the smaller the amount of In oxide was contained in the thermal diffusion layer (light transmissive layer), the higher the light transmittance of each of the L0 layers was and the lower the optimum recording power was.

The invention claimed is:

1. A multi-layered phase-change optical recording medium, comprising:
a first substrate disposed at the front side as viewed from the laser beam irradiation side,
a second substrate disposed at the innermost side as viewed from the laser beam irradiation side,
each of the first substrate and the second substrate having a serpentine spiral guide groove on a recording surface side thereof,
intermediate layers, and
a plurality of information layers each having a phase-change recording layer, being disposed via each of the intermediate layers in between the first substrate and the second substrate,
each of the information layers other than the information layer disposed at the innermost side as viewed from the first substrate side comprising the following five layers:
an under protective layer,
the phase-change recording layer,
an upper protective layer,
a semi-transparent reflective layer, and
a thermal diffusion layer or a light transmissive layer, and
the information layer disposed at the innermost side as viewed from the first substrate side comprising:
an under protective layer,
the phase-change recording layer,
an upper protective layer, and
a reflective layer,
wherein each of the thermal diffusion layers or light transmissive layers of the respective information layers other than the information layer disposed at the innermost side as viewed from the first substrate side comprises an In oxide, a Zn oxide, an Sn oxide and an Si oxide, and when the contents of the In oxide, the Zn oxide, the Sn oxide and the Si oxide are represented by "a", "b", "c" and "d" [mol %] respectively, the following requirements are satisfied, and when the refractive index of the first and second substrates was represented by "n", the laser light wavelength is represented by "λ" and the depth of the groove guide of the first and second substrates is represented by H, the depth of the groove guide H satisfies the following requirement, $3 \leq a \leq 50$ $0 < d \leq 30$ $a+b+c+d=100$ $\lambda/17n \leq H \leq \lambda/11.5n$.

2. The multi-layered phase-change optical recording medium according to claim 1, wherein each of the phase-change recording layers comprises at least three elements of Ge, Sb and Te, and when the composition ratio of the Ge, Sb and Te is represented by "α", "β" and "γ" [atomic %], the following requirements are satisfied, $2 \leq \alpha \leq 20$ $60 \leq \beta \leq 75$ $6 \leq \gamma \leq 30$.

3. The multi-layered phase-change optical recording medium according to claim 1, wherein each of the upper protective layer in the respective information layers other than the information layer disposed at the innermost side as viewed from the first substrate side comprises an In oxide, a Zn oxide, an Sn oxide and an Si oxide or a Ta oxide, and when the contents of the In oxide, the Zn oxide, the Sn oxide and Si oxide or the Ta oxide are represented by "e", "f", "g" and "h" [mol %] respectively, the following requirements are satisfied, $3 \leq e \leq 20$ $50 \leq f \text{ or } g \leq 90$ $0 \leq h \leq 20$ $e+f+g+h=100$.

4. The multi-layered phase-change optical recording medium according to claim 1, wherein each of the semi-transparent reflective layers in the respective information layers other than the information layer disposed at the innermost side as viewed from the first substrate side comprises Cu as the main component.

5. The multi-layered phase-change optical recording medium according to claim 1, wherein each of the under protective layers in the respective information layers comprises ZnS and $SiO_2$.

6. The multi-layered phase-change optical recording medium according to claim 1, wherein each of the thermal diffusion layers or light transmissive layers includes a non-zero amount of the Sn oxide and a non-zero amount of the Si oxide.

7. The multi-layered phase-change optical recording medium according to claim 1, wherein the Si oxide in each of the thermal diffusion layers or light transmissive layers is $SiO_2$.

8. An optical recording medium, comprising:
a first substrate disposed at the front side as viewed from the laser beam irradiation side,
a second substrate disposed at the innermost side as viewed from the laser beam irradiation side,
an intermediate layer, and
an information layer having a phase-change recording layer, being disposed in between the first substrate and the intermediate layer,
the information layer comprising the following five layers:
an under protective layer,
the phase-change recording layer,
an upper protective layer,
a semi-transparent reflective layer, and
a thermal diffusion layer or a light transmissive layer, and
wherein the thermal diffusion layer or light transmissive layer of the information layer comprises an In oxide, a Zn oxide, an Sn oxide and an Si oxide, and when the contents of the In oxide, the Zn oxide, the Sn oxide and the Si oxide are represented by "a", "b", "c" and "d" [mol %] respectively, the following requirements are satisfied $3 \leq a \leq 50$ $0 < d \leq 30$ $a+b+c+d=100$.

* * * * *